United States Patent
Rusanovskyy et al.

(10) Patent No.: US 11,558,616 B2
(45) Date of Patent: Jan. 17, 2023

(54) METHODS FOR QUANTIZATION PARAMETER CONTROL FOR VIDEO CODING WITH JOINED PIXEL/TRANSFORM BASED QUANTIZATION

(71) Applicant: QUALCOMM Incorporated, San Diego, CA (US)

(72) Inventors: Dmytro Rusanovskyy, San Diego, CA (US); Yan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/192,335

(22) Filed: Mar. 4, 2021

(65) Prior Publication Data
US 2021/0281844 A1    Sep. 9, 2021

Related U.S. Application Data

(60) Provisional application No. 62/985,776, filed on Mar. 5, 2020.

(51) Int. Cl.
*H04N 19/124* (2014.01)
*H04N 19/70* (2014.01)
*H04N 19/186* (2014.01)

(52) U.S. Cl.
CPC ......... *H04N 19/124* (2014.11); *H04N 19/186* (2014.11); *H04N 19/70* (2014.11)

(58) Field of Classification Search
None
See application file for complete search history.

(56) References Cited

U.S. PATENT DOCUMENTS 10,681,358 B2    6/2020   Rusanovskyy et al.
2013/0259141 A1  10/2013  Van Der Auwera et al.
(Continued)

OTHER PUBLICATIONS

Bross B., et al., "Versatile Video Coding (Draft 8)", JVET-Q2001-vC, Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001, Feb. 9, 2020 (Feb. 9, 2020), XP030285388, 512 pages, Retrieved from the Internet: URL: http://phenix.int-evry.fr/jvet/doc_end_user/documents/17_Brussels/wg11/JVET-Q2001-v13.zip. JVET-Q2001-vC.docx [retrieved on Feb. 9, 2020].
(Continued)

*Primary Examiner* — Reza Aghevli
(74) *Attorney, Agent, or Firm* — Shumaker & Sieffert, P.A.

(57) ABSTRACT

An example device for processing video data includes memory configured to store the video data and one or more processors coupled to the memory. The one or more processors are configured to adjust a chroma dynamic range adjustment (DRA) scale value based on a luma DRA scale value and determine a chroma quantization parameter (QP) based on the luma adjusted chroma DRA scale value, wherein the chroma QP comprises an integer component and a fractional component. The one or more processors are configured to determine an integer chroma QP offset based on the integer component and determine a fractional chroma QP offset based on the fractional component. The one or more processors are configured to determine a DRA chroma scale adjustment value based on the integer chroma QP offset and the fractional chroma QP offset and process the video data based on the DRA chroma scale adjustment value.

20 Claims, 16 Drawing Sheets

(56) References Cited

U.S. PATENT DOCUMENTS

| | | | |
|---|---|---|---|
| 2014/0003497 | A1 | 1/2014 | Sullivan et al. |
| 2016/0309154 | A1* | 10/2016 | Rusanovskyy ...... H04N 19/184 |
| 2017/0085894 | A1* | 3/2017 | Ramasubramanian ...................... H04N 19/85 |
| 2017/0085896 | A1* | 3/2017 | Ramasubramanian ...................... H04N 19/463 |
| 2017/0111643 | A1* | 4/2017 | Bugdayci Sansli .. H04N 19/184 |
| 2018/0020241 | A1* | 1/2018 | Li ......................... H04N 19/18 |
| 2018/0167615 | A1* | 6/2018 | Kim ....................... H04N 19/98 |
| 2018/0184088 | A1* | 6/2018 | Byun .................... H04N 19/157 |
| 2019/0014330 | A1* | 1/2019 | Ramasubramanian ...................... H04N 19/186 |
| 2019/0020875 | A1* | 1/2019 | Liu ....................... H04N 19/192 |
| 2019/0068969 | A1* | 2/2019 | Rusanovskyy .... H04N 19/1887 |
| 2019/0124330 | A1* | 4/2019 | Chien ................... H04N 19/124 |
| 2019/0320174 | A1* | 10/2019 | Ramasubramanian ...................... H04N 19/196 |

OTHER PUBLICATIONS

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 1. JVET Meeting, Oct. 19-21, 2015, Geneva (The Joint Video Exploration Team of ISO/IEC JTC1/SC29/WG11 and ITU-T SG.16 WP 3), No. H.266 JVET-A1001, Feb. 24, 2016 (Feb. 24, 2016), XP030150000, 27 Pages, URL: http://phenix.int-evry.fr/jvet/.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp. 1-14, ISBN: 978-1-61482-829-7.

"Information Technology—General Video Coding—Part 1: Essential Video Coding", ISO/IEC JTC1/SC 29/WG 4, ISO/IEC 23094-1:2020(E), 2020, 427 pages.

International Search Report and Written Opinion—PCT/US2021/021165—ISA/EPO—dated May 14, 2021.

ITU-R Recommendation BT.2020-2: "Parameter Values for Ultra-High Definition Television Systems for Production and International Programme Exchange", ITU-R BT.2020-2, Oct. 2015, 8 Pages.

ITU-R Recommendation BT.709-6, "Parameter Values for the HDTV Standards for Production and International Programme Exchange", ITU-R BT.709-6, Jun. 2015, 19 Pages.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

Lu T., (Dolby) et al.,"CE12-2: HDR In-Loop Reshaping", 124. MPEG Meeting, Oct. 8, 2018-Oct. 12, 2018, Macao, (Motion Picture Expert Group or ISO/IEC JTC1/SC29/WG11) No. m44266, Sep. 25, 2018 (Sep. 25, 2018), XP030190981, 19 Pages, Retrieved from the Internet: URL: http://phenix.int-evry.fr/mpeg/doc_end_user/documents/124_Macao/wg11/m44266-JVET-L0245-v1-JVET-L0245_HDR_inloop_reshaping.zip. JVET-L0245 CE12-2 HDR in loop reshaping v1. docx. [retrieved on Sep. 25, 2018].

"SMPTE Standard for Motion-Picture Film (8-mm TypeR)—Camera Aperture Image and Usage", SMPTE 231-2004, Society of Motion Picture & Television Engineers, Nov. 8, 2004, 4 pages.

Ramasubramanian A.K., et al., "HDR CE2.a-1: Report on LCS", JCTVC-W0101, Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, pp. 1-2.

Sullivan G.J., et al., "Standardized Extensions of High Efficiency Video Coding (HEVC)", IEEE Journal of Selected Topics in Signal Processing, vol. 7, No. 6, Dec. 2013, pp. 1001-1016, Retrieved on Mar. 23, 2020 (Mar. 23, 2020) from https://ieeexplore.ieee.org/stamp/stamp.jsp?arnumber=6630053.

Segall A., et al., "JVET Common Test Conditions and Evaluation Procedures for HDR/WCG Video", Joint Video Exploration Team (JVET) of ITU-T SG 16 WP 3 and ISO/IEC JTC 1/SC 29/WG 11, 16th Meeting: Geneva, CH, Oct. 1-11, 2019, Document: JVET-P2011, pp. 1-10.

Choi K., et al., "Potential Future Improvement of Essential Video Coding", MPEG Meeting, Brussels, BE, (Motion Picture Expert Group or ISO/IEC JTC1/SC29/WG11), No. N18984, Jan. 2020, XP030287485, 339 pp.

* cited by examiner

SPECIFICATION OF Qpc AS A FUNCTION OF qPi FOR CHROMAARRAYTYPE EQUAL TO 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | =qPi | 29 | 30 | 31 | 32 | 33 | 33 | 34 | 34 | 35 | 35 | 36 | 36 | 37 | 37 | =qPi−6 |

SPECIFICATION OF Qpc AS A FUNCTION OF qPi (sps_iqt_flag == 1), chromaQpTable[] ← 819

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | =qPi | 29 | 30 | 31 | 32 | 33 | 34 | 35 | 36 | 37 | 38 | 39 | 40 | 40 | 40 | =qPi−3 |

FIG. 12

METHODS FOR QUANTIZATION PARAMETER CONTROL FOR VIDEO CODING WITH JOINED PIXEL/TRANSFORM BASED QUANTIZATION

This patent application claims the benefit of U.S. Provisional Patent Application No. 62/985,776, filed Mar. 5, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, MPEG-5 Essential Video Coding (EVC), ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to the field of coding of video signals with High Dynamic Range (HDR) and Wide Color Gamut (WCG) representations. More specifically, the current disclosure describes techniques for signaling and operations applied to video data in certain color spaces that may enable more efficient compression of HDR and WCG video data. The techniques may improve the compression efficiency of hybrid-based video coding systems utilized for coding HDR & WCG video data.

In video coding, it is beneficial to have harmonized techniques for processing video data. When techniques are not harmonized one video decoder may process the video data differently than intended by a video encoder and differently than another video decoder. The techniques of this disclosure include techniques and constraints for more efficient implementation of dynamic range adjustment (DRA) with harmonized pixel/transform domain quantization and facilitate bit matching across different video decoders.

In one example, a method of processing video data includes adjusting a chroma dynamic range adjustment (DRA) scale value based on a luma DRA scale value, determining a chroma quantization parameter (QP) based on the luma adjusted chroma DRA scale value, wherein the chroma QP comprises an integer component and a fractional component, determining an integer chroma QP offset based on the integer component of the chroma QP, determining a fractional chroma QP offset based on the fractional component of the chroma QP, determining a DRA chroma scale adjustment value based on the integer chroma QP offset and the fractional chroma QP offset, and processing the video data based on the DRA chroma scale adjustment value.

In another example, a device includes memory configured to store video data and one or more processors implemented in circuitry and communicatively coupled to the memory, the one or more processors being configured to: adjust a chroma dynamic range adjustment (DRA) scale value based on a luma DRA scale value; determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

In another example, a device for processing video data includes means for adjusting a chroma dynamic range adjustment (DRA) scale value based on a luma DRA scale value, means for determining a chroma quantization parameter (QP) based on the luma adjusted chroma DRA scale value, wherein the chroma QP comprises an integer component and a fractional component, means for determining an integer chroma QP offset based on the integer component of the chroma QP, means for determining a fractional chroma QP offset based on the fractional component of the chroma QP, means for determining a DRA chroma scale adjustment value based on the integer chroma QP offset and the fractional chroma QP offset, and means for processing the video data based on the DRA chroma scale adjustment value.

In another example, a computer-readable storage medium is encoded with instructions that, when executed, cause a programmable processor to adjust a chroma dynamic range adjustment (DRA) scale value based on a luma DRA scale value, determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

As used herein determining may include obtaining, receiving, reading from memory, calculating or the like.

The details of one or more examples are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating a table describing the specification of QpC as a function of qPi for ChromaArrayType equal to 1.

FIG. 12 is a conceptual diagram illustrating a table describing the specification of QpC as a function of qPi (sps_iqt_flag==1), chromaQpTable[ ] for chroma_qp_table_present_flag equal to 0.

DETAILED DESCRIPTION

In video coding, it is beneficial to have harmonized techniques for processing video data. When techniques are not harmonized one video decoder may process the video data differently than intended by a video encoder and differently than another video decoder. The techniques of this disclosure include techniques and constraints for more efficient implementation of DRA with harmonized pixel/transform domain quantization and facilitate bit matching across different video decoders.

In some video codecs capable of dynamic range adjustment (DRA), mathematical operations associated with DRA may include logarithmic and/or exponential operations. These operations may be expensive to implement and may use an excessive amount of processing power. The techniques of this disclosure may replace the logarithmic and/or exponential operations with approximations of the operations, thereby reducing expense and saving processing power.

Figure 1:
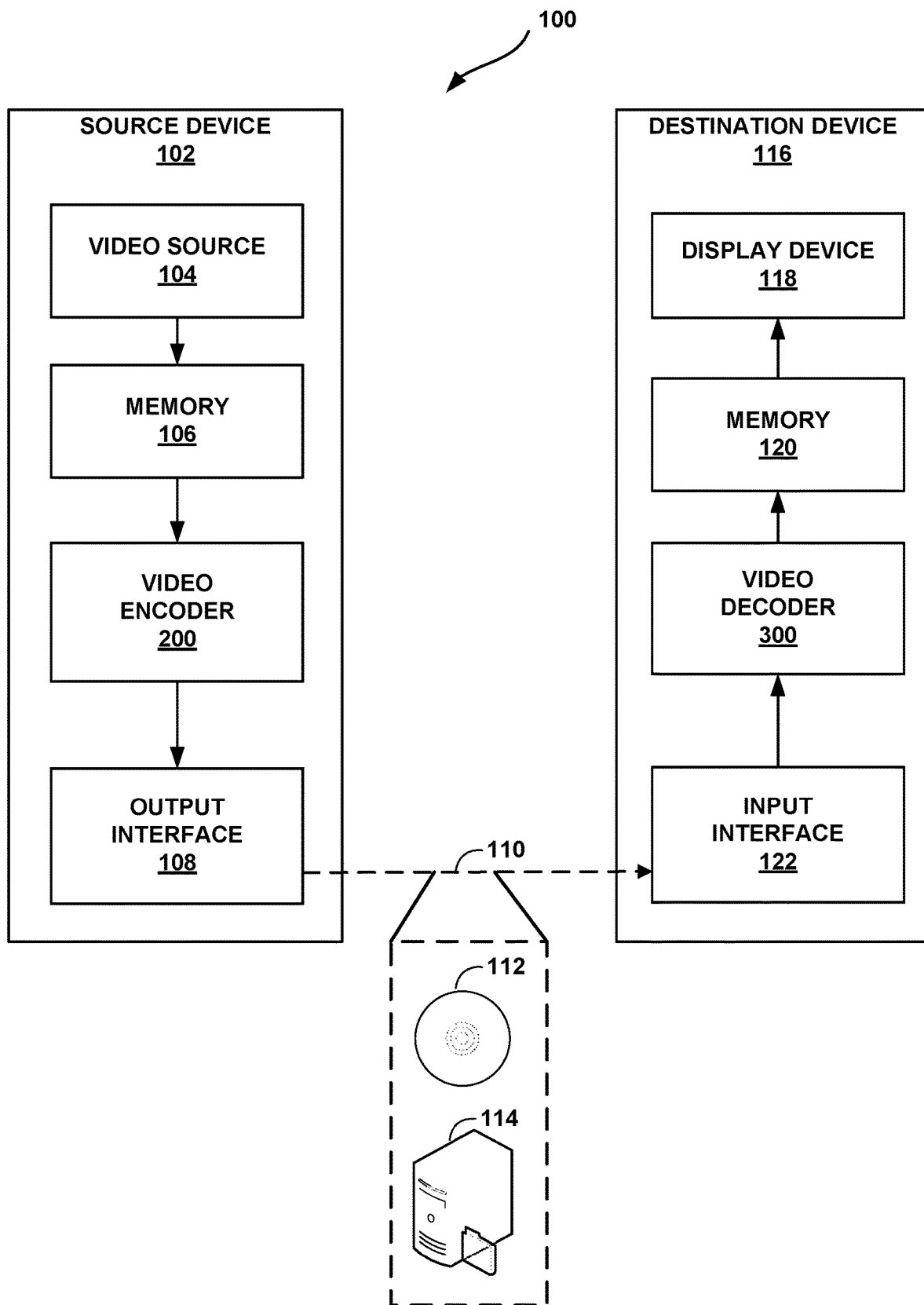
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling and operations applied to video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for signaling and operations applied to video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vC (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to EVC or VVC. According to EVC or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of EVC and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of EVC provide DC, bi-linear, planar, and thirty angular intra-prediction modes. In general, video encoder 200 selects an intra-prediction mode that describes neighboring samples to a current block (e.g., a block of a CU) from which to predict samples of the current block. Such samples may generally be above and to the left of the current block in the same picture as the current block, assuming video encoder 200 codes CTUs and CUs in raster scan order (left to right, top to bottom).

Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, in some video codecs capable of dynamic range adjustment (DRA), mathematical operations associated with DRA may include logarithmic and/or exponential operations. DRA may be used by a video decoder, such as video decoder 300, to adjust the dynamic range of decoded pixels. These operations may be expensive to implement as they may use an excessive amount of processing power. The techniques of this disclosure may replace the logarithmic and/or exponential operations with approximations of the operations, thereby reducing expense and saving processing power.

In accordance with the techniques of this disclosure, a method of processing video data includes adjusting a chroma dynamic range adjustment (DRA) scale value based on a luma DRA scale value, determining a chroma quantization parameter (QP) based on the luma adjusted chroma DRA scale value, wherein the chroma QP comprises an integer component and a fractional component, determining an integer chroma QP offset based on the integer component of the chroma QP, determining a fractional chroma QP offset based on the fractional component of the chroma QP, determining a DRA chroma scale adjustment value based on the integer chroma QP offset and the fractional chroma QP offset, and processing the video data based on the DRA chroma scale adjustment value. In this manner, mathematical operations that would otherwise be implemented as logarithmic and/or exponential operations are replaced with approximations of the operations, which may reduce expense and save processing power.

In accordance with the techniques of this disclosure, a device for processing video data includes memory configured to store video data and one or more processors implemented in circuitry and communicatively coupled to the memory, the one or more processors being configured to: adjust a chroma dynamic range adjustment (DRA) scale value based on a luma DRA scale value; determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

In accordance with the techniques of this disclosure, a device for processing video data includes means for adjusting a chroma DRA scale value based on a luma dynamic range adjustment (DRA) scale value, means for determining a chroma quantization parameter (QP) based on the luma adjusted chroma DRA scale value, wherein the chroma QP comprises an integer component and a fractional component, means for determining an integer chroma QP offset based on the integer component of the chroma QP, means for determining a fractional chroma QP offset based on the fractional component of the chroma QP, means for determining a DRA chroma scale adjustment value based on the integer chroma QP offset and the fractional chroma QP offset, and means for processing the video data based on the DRA chroma scale adjustment value.

In accordance with the techniques of this disclosure, a computer-readable storage medium is encoded with instructions that, when executed, cause a programmable processor to adjust a chroma DRA scale value based on a luma dynamic range adjustment (DRA) scale value, determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

In accordance with the techniques of this disclosure, a method of coding video data includes performing dynamic range adjustment (DRA) on the video data, and coding the video data based on the dynamic range adjustment, wherein the performing DRA comprises utilizing a constrained bitstream of the video data.

In accordance with the techniques of this disclosure, a method of coding video data includes performing DRA on the video data, and coding the video data based on the DRA, wherein the performing DRA comprises determining an integer approximation of an exponential function or a logarithmic function.

In accordance with the techniques of this disclosure, a method of coding video data includes performing DRA on the video data, and coding the video data based on the DRA, wherein the performing DRA comprises determining a subsampled representation of an exponential function or a logarithmic function.

In accordance with the techniques of this disclosure, a method of coding video data includes determining whether a scale value or a quantization parameter (QP) value is exactly tabulated, based upon the scale value or QP value not being exactly tabulated, approximating an exponential function or a logarithmic function through linear interpolation, determining an estimated scale value or QP value based on the approximation, and coding the video data based on the estimated scale value or QP value.

In accordance with the techniques of this disclosure, a method of coding video data includes performing DRA on the video data, and coding the video data based on the DRA, wherein the performing DRA comprises converting between scale values or QP values only using integer values.

In accordance with the techniques of this disclosure, a method of coding video data includes any of or any combination of the techniques of this disclosure.

In accordance with the techniques of this disclosure, a device includes memory configured to store video data communicatively coupled to one or more processors implemented in circuitry, the one or more processors being configured to perform any of the techniques of this disclosure.

In accordance with the techniques of this disclosure, a device includes at least one means for performing any of the techniques of this disclosure.

In accordance with the techniques of this disclosure, a computer-readable storage medium is encoded with instructions that, when executed, cause a programmable processor to perform any of the techniques of this disclosure.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
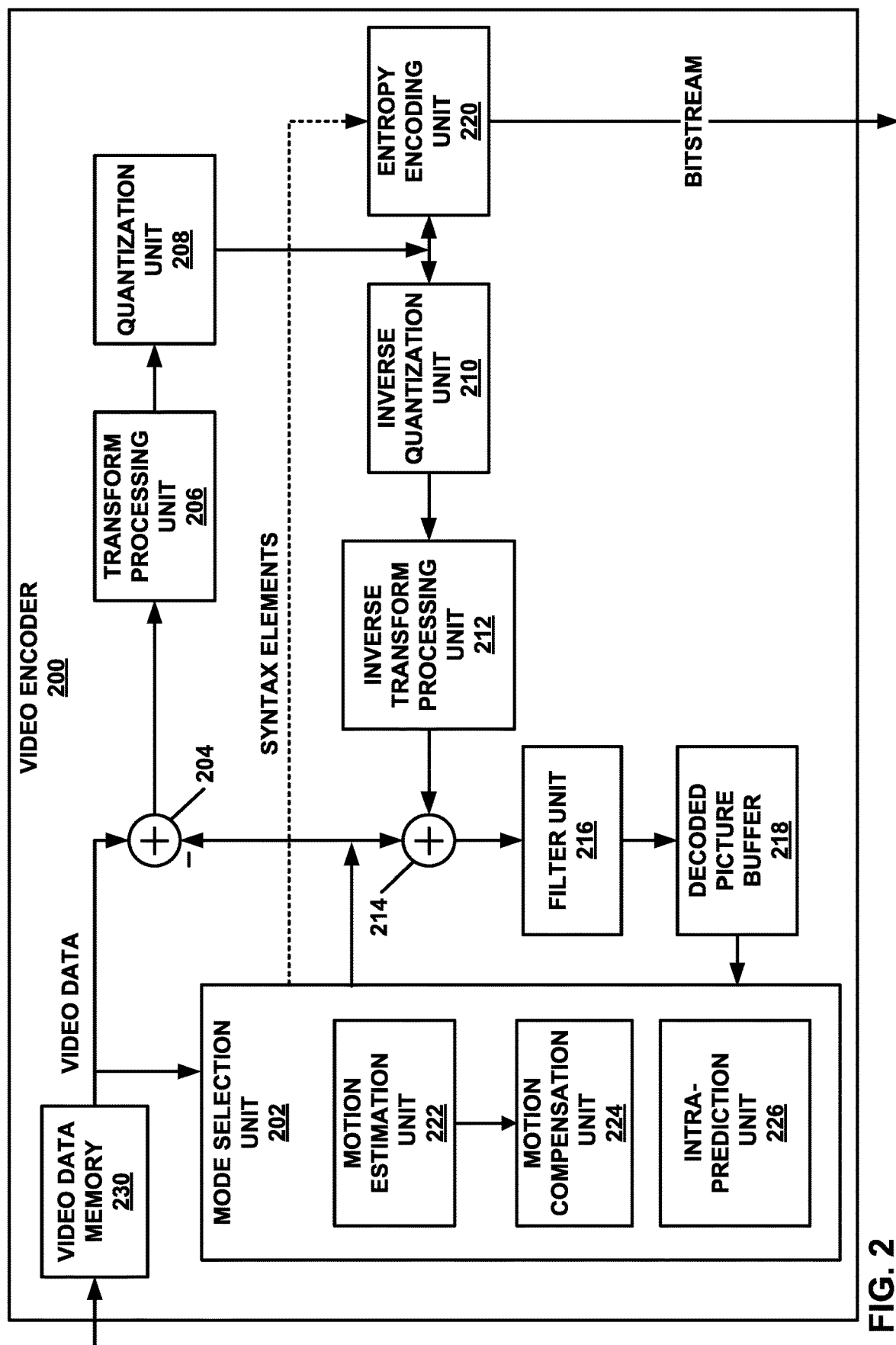
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of EVC, VVC (ITU-T H.266, under development), and HEVC (ITU-T H.265). However, the techniques of this disclosure may be performed by video encoding devices that are configured to other video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform dynamic range adjustment (DRA) on the video data, and encode the video data based on the dynamic range adjustment, wherein the performing DRA comprises utilizing a constrained bitstream of the video data.

Video encoder 200 represents an example of a device configured to encode video data including a memory configured to store video data, and one or more processing units implemented in circuitry and configured to perform DRA on the video data, and encode the video data based on the DRA, wherein the performing DRA comprises determining an integer approximation of an exponential function or a logarithmic function.

Video encoder 200 represents an example of a device configured to encode video data including a memory configured to store video data, and one or more processing units implemented in circuitry and configured to perform DRA on the video data, and encode the video data based on the DRA, wherein the performing DRA comprises determining a subsampled representation of an exponential function or a logarithmic function.

Video encoder 200 represents an example of a device configured to encode video data including a memory configured to store video data, and one or more processing units implemented in circuitry and configured to determine whether a scale value or a quantization parameter (QP) value is exactly tabulated, based upon the scale value or QP value not being exactly tabulated, approximate an exponential function or a logarithmic function through linear interpolation, determine an estimated scale value or QP value based on the approximation, and encode the video data based on the estimated scale value or QP value.

Video encoder 200 represents an example of a device configured to encode video data including a memory configured to store video data, and one or more processing units implemented in circuitry and configured to perform DRA on the video data, and encode the video data based on the DRA, wherein the performing DRA comprises converting between scale values or QP values only using integer values.

Video encoder 200 represents an example of a device configured to encode video data including a memory configured to store video data, and one or more processing units implemented in circuitry and configured to perform any of or any combination of the techniques of this disclosure.

Figure 3:
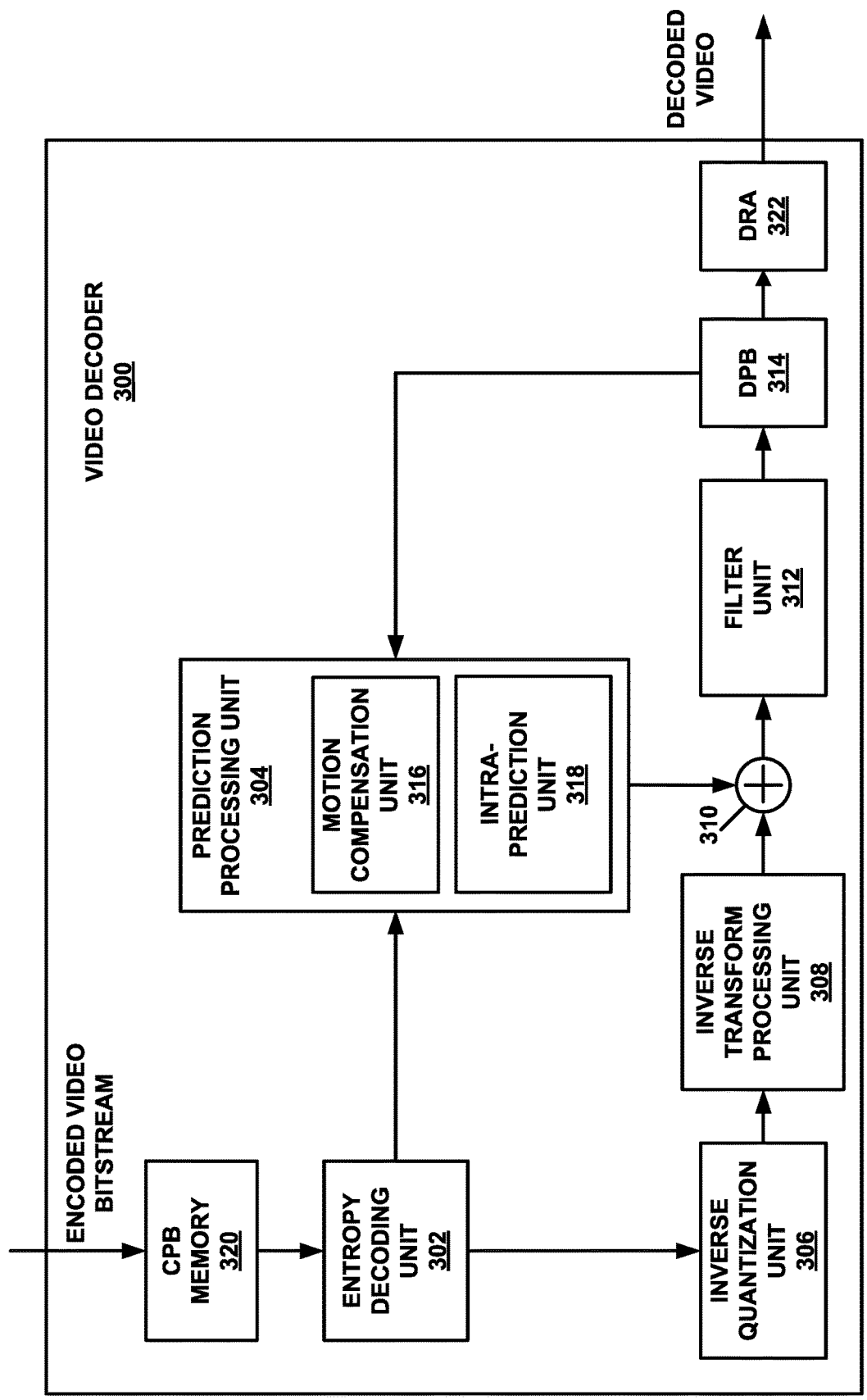
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of EVC, VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1. Prior to outputting the decoded pictures from DPB 314, video decoder 300 may apply DRA in DRA unit 322 to the decoded pictures. As part of applying DRA, DRA unit 322 may determine a luma adjusted chroma DRA scale value based on a luma DRA scale value. DRA unit 322 may determine a chroma QP based on the luma adjusted chroma DRA scale. DRA unit 322 may determine an integer chroma QP offset based on an integer component of the chroma QP. DRA unit 322 may determine a fractional chroma QP offset based on a fractional component of the chroma QP. DRA unit 322 may determine a DRA chroma scale adjustment value based on the integer chroma QP offset and the fractional chroma QP offset. DRA unit 322 may also process the video data based on the DRA chroma scale adjustment value.

In this manner, video decoder 300 represents an example of a video decoding device including a memory configured to store video data, and one or more processing units implemented in circuitry and configured to adjust a chroma DRA scale value based on a luma DRA scale value; determine a chroma QP based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

Video decoder 300 also represents an example of a video decoding device including a memory configured to store video data, and one or more processing units implemented in circuitry and configured to perform dynamic range adjustment (DRA) on the video data, and decode the video data based on the dynamic range adjustment, wherein the performing DRA comprises utilizing a constrained bitstream of the video data.

Video decoder 300 also represents an example of a device configured to decode video data including a memory configured to store video data, and one or more processing units implemented in circuitry and configured to perform DRA on the video data, and decode the video data based on the DRA, wherein the performing DRA comprises determining an integer approximation of an exponential function or a logarithmic function.

Video decoder 300 represents an example of a device configured to decode video data including a memory configured to store video data, and one or more processing units implemented in circuitry and configured to perform DRA on the video data, and decode the video data based on the DRA, wherein the performing DRA comprises determining a subsampled representation of an exponential function or a logarithmic function.

Video decoder 300 represents an example of a device configured to decode video data including a memory configured to store video data, and one or more processing units implemented in circuitry and configured to determine whether a scale value or a quantization parameter (QP) value is exactly tabulated, based upon the scale value or QP value not being exactly tabulated, approximate an exponential function or a logarithmic function through linear interpolation, determine an estimated scale value or QP value based on the approximation, and decode the video data based on the estimated scale value or QP value.

Video decoder 300 represents an example of a device configured to decode video data including a memory configured to store video data, and one or more processing units implemented in circuitry and configured to perform DRA on the video data, and decode the video data based on the DRA, wherein the performing DRA comprises converting between scale values or QP values only using integer values.

Video decoder 300 represents an example of a device configured to decode video data including a memory configured to store video data, and one or more processing units implemented in circuitry and configured to perform any of or any combination of the techniques of this disclosure.

High dynamic range (HDR) and wide color gamut (WCG) are now discussed. Next generation video applications may operate with video data representing captured scenery with high dynamic range (HDR) and wide color gamut (WCG). Parameters of the utilized dynamic range and color gamut are two independent attributes of video content, and their specification for purposes of digital television and multimedia services are defined by several international standards. For example, ITU-R Rec. 709 defines parameters for high definition television (HDTV) such as Standard Dynamic Range (SDR) and standard color gamut (SCG) and ITU-R Rec.2020 specifies ultra-high definition television (UHDTV) parameters such as HDR and WCG. There are also other standards development organization (SDO) documents specifying these attributes in other systems, e.g., P3 color gamut is defined in SMPTE-231-2 and some parameters of HDR are defined STMPTE-2084. A brief description of dynamic range and color gamut for video data follows.

Dynamic range is typically defined as the ratio between the minimum and maximum brightness of the video signal. Dynamic range is also measured in terms of 'f-stop', where one f-stop corresponds to a doubling of a signal's dynamic range. In MPEG's definition, HDR content is such content that features brightness variation with more than 16 f-stops. In some definitions, levels between 10 and 16 f-stops are considered as intermediate dynamic range, but are considered HDR in other definitions. At the same time, the human visual system (HVS) is capable of perceiving a much larger dynamic range, however the HVS includes an adaptation mechanism to narrow a so-called simultaneous range.

Video application and services may be regulated by Rec.709 and provide SDR, typically supporting a range of brightness (or luminance) of around 0.1 to 100 candelas (cd) per m2 (often referred to as "nits"), leading to less than 10 f-stops. Next generation video services are expected to provide a dynamic range of up-to 16 f-stops and some initial parameters have been specified in SMPTE-2084 and Rec.2020.

Figure 4:
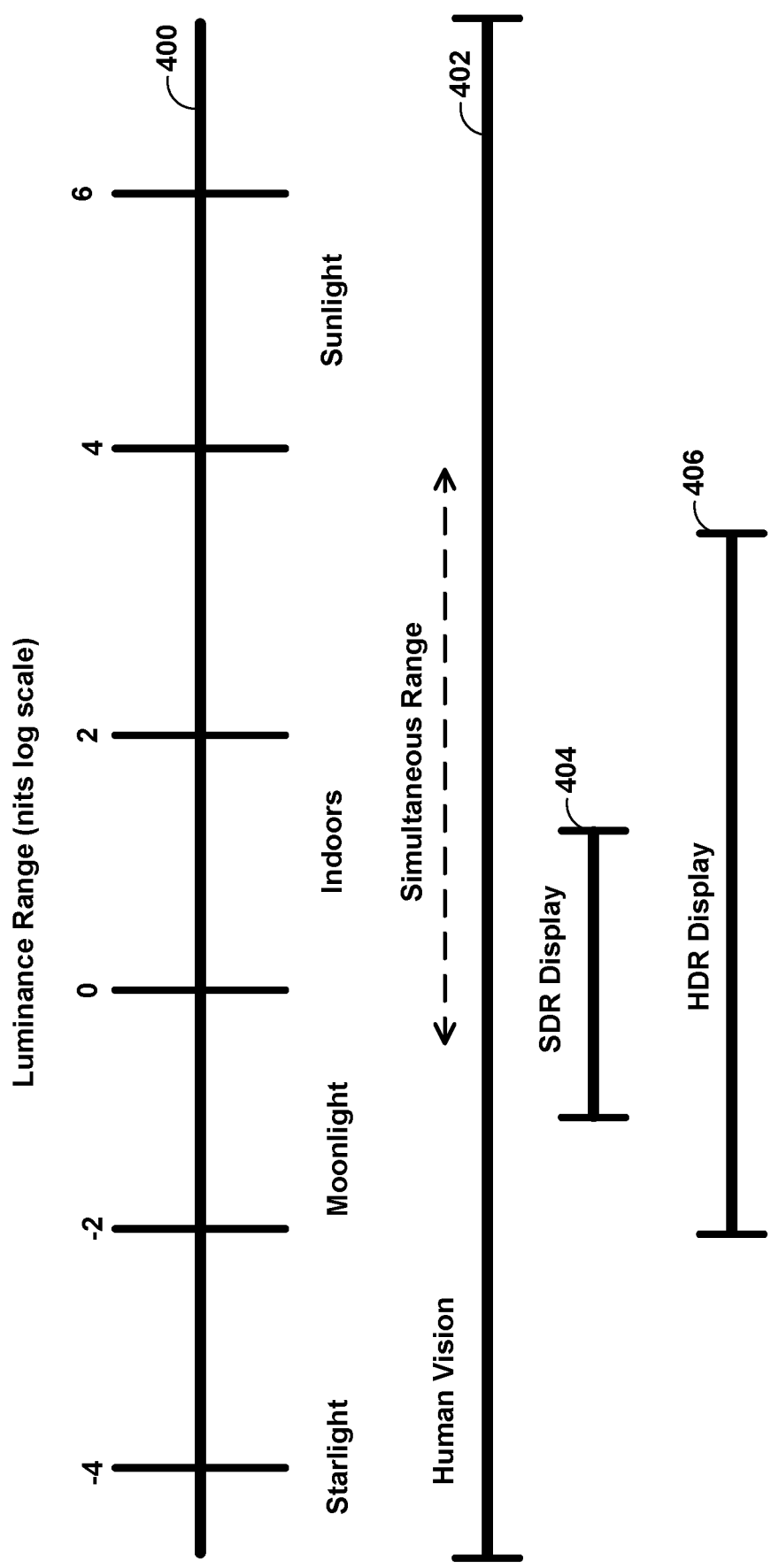
FIG. 4 is a conceptual diagram illustrating the visualization of dynamic range provided by standard dynamic range (SDR) of high definition television (HDTV), high dynamic range (HDR) of ultra-high definition television (UHDTV) and human visual system (HVS) dynamic range.

FIG. 4 is a conceptual diagram illustrating an example dynamic range of SDR in HDTV, an expected HDR in UHDTV and the HVS dynamic range. For example, graph 400 shows luminance of starlight, moonlight, indoors, and sunlight in nits on a logarithmic scale. Graph 402 shows the range of human vision and the HVS simultaneous dynamic range (also called the steady-state dynamic range) with respect to graph 400. Graph 404 depicts the SDR in HDTV for a display with respect to graph 400 and graph 402. For example, the SDR for a display may overlap a portion of the luminance range of moonlight to indoors and may overlap a portion of the HVS simultaneous range. Graph 406 depicts the HDR in UHDTV for a display, with respect to graphs 400-404. As can be seen, the HDR is much larger than the SDR of graph 404 and encompasses more of the HVS simultaneous range than the SDR of graph 404.

Figure 5:
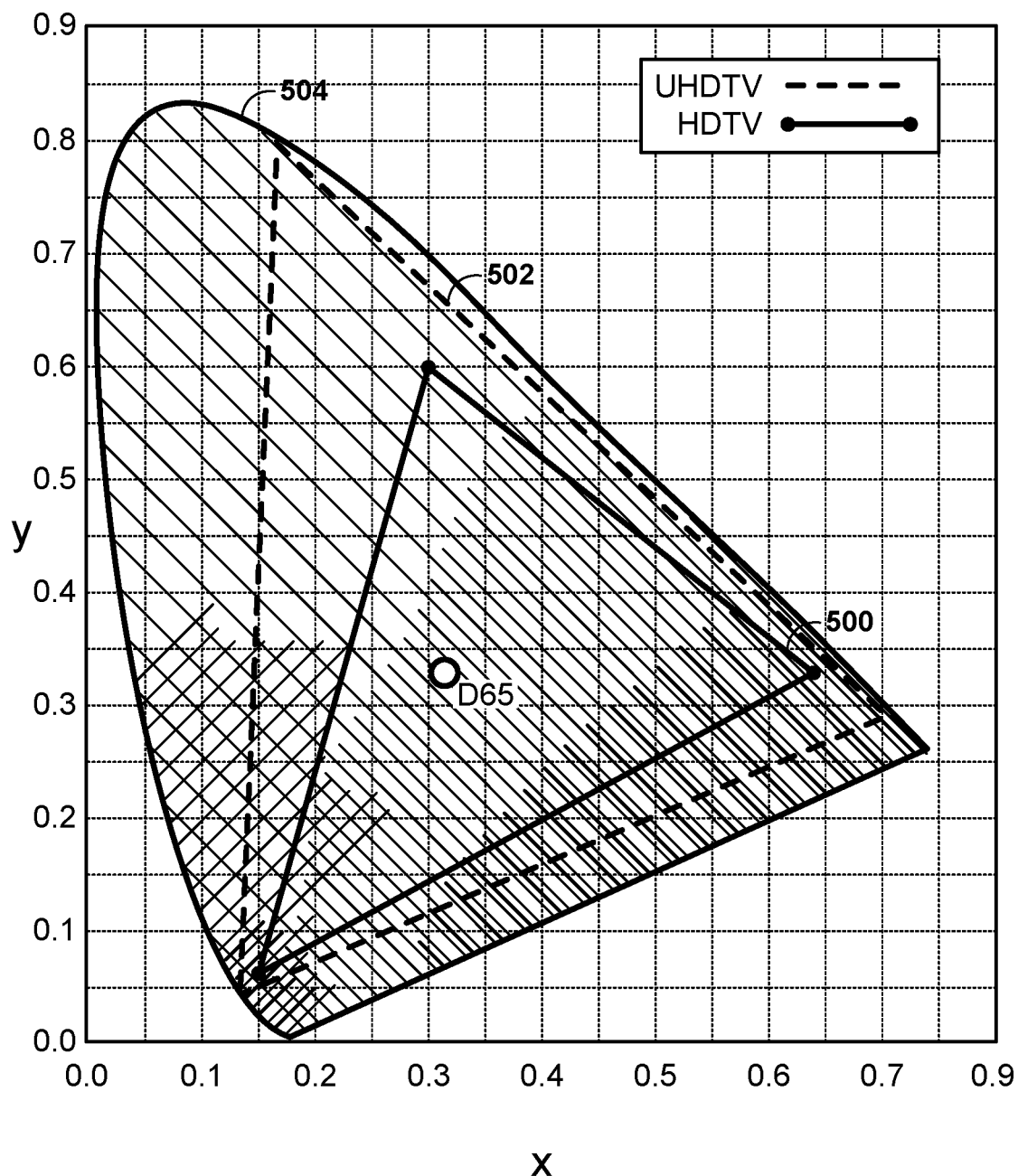
FIG. 5 is a conceptual diagram illustrating an example color gamut.

FIG. 5 is a conceptual diagram illustrating an example color gamut graph. An aspect of leading to a more realistic video experience, other than HDR, is the color dimension, which is conventionally defined by the color gamut. In the example of FIG. 5, a visual representation of SDR color gamut (triangle 500 based on the BT.709 color red, green and blue color primaries), and the wider color gamut that for UHDTV (triangle 502 based on the BT.2020 color red, green and blue color primaries). FIG. 5 also depicts the so-called spectrum locus (delimited by the tongue-shaped area 504), representing limits of natural colors. As illustrated by FIG. 5, moving from BT.709 (triangle 500) to BT.2020 (triangle 502) color primaries aims to provide UHDTV services with about 70% more colors. The circle labeled D65 specifies the white color for the given specifications.

A few examples of color gamut specifications are shown in Table 1.

TABLE 1

| Colorimetry parameters for selected color spaces RGB color space parameters | | | | | | | | |
|---|---|---|---|---|---|---|---|---|
| Color | White point | | Primary colors | | | | | |
| space | xW | YW | XR | YR | XG | YG | XB | YB |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Compression of HDR video data is now discussed. HDR/WCG is typically acquired and stored at a very high precision per component (which may even be stored with floating point precision), with the 4:4:4 chroma format and a very wide color space (e.g., XYZ). This representation targets high precision and is (almost) mathematically lossless. However, this format features many redundancies and is not optimal for compression purposes. A lower precision format with an HVS-based assumption is typically utilized for state-of-the-art video applications.

Figure 6:
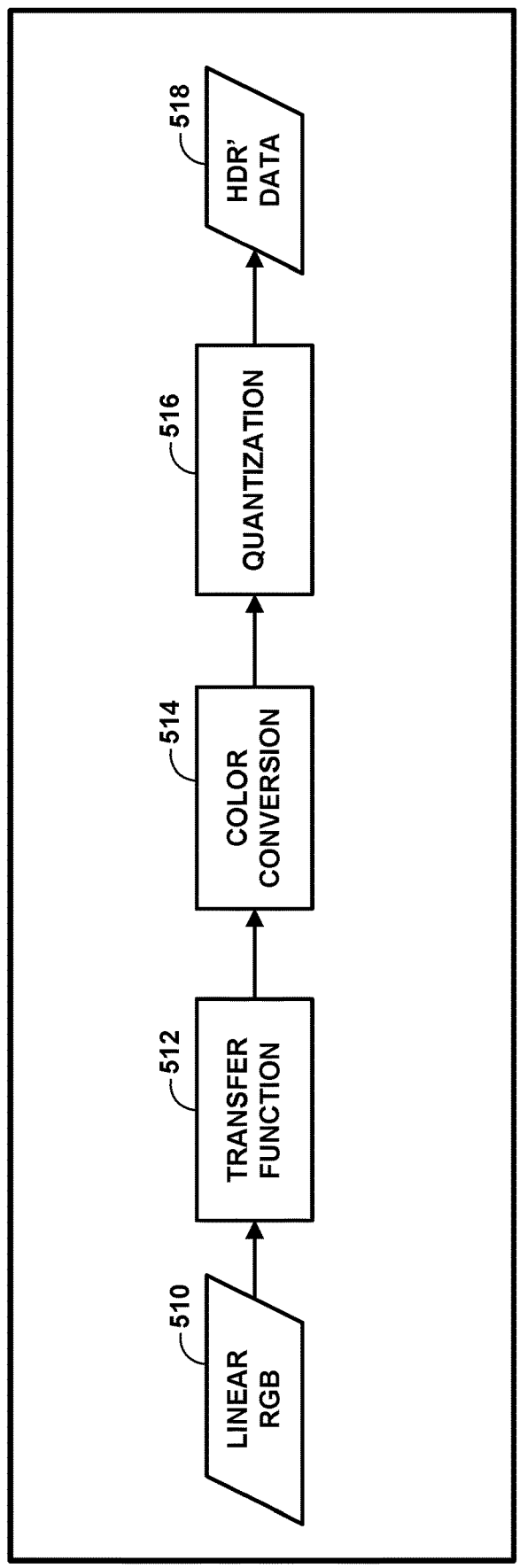
FIG. 6 is a conceptual diagram illustrating an example HDR/wide color gamut (WCG) representation conversion.

FIG. 6 is a block diagram illustrating an example format conversion technique. Video encoder 200 may perform the format conversion techniques to transform linear RGB 510 to HDR' data 518. One example of a video data format conversion process for purposes of compression includes three major processes, as shown in FIG. 6. The techniques of FIG. 6 may be performed by source device 12 (which may be an example of video encoder 200). Linear RGB data 510 may be HDR/WCG video data and may be stored in a floating point representation. Linear RGB data 510 may be compacted using a non-linear transfer function (TF) 512 for dynamic range compacting. Transfer function 512 may compact linear RGB data 510 using any number of non-linear transfer functions, e.g., the perceptual quantizer (PQ) TF as defined in SMPTE-2084. In some examples, color conversion process 514 converts the compacted data into a more compact or robust color space (e.g., a YUV or YCrCb color space) that is more suitable for compression by a hybrid video encoder. A hybrid video encoder, such as video encoder 200, is a video encoder that utilizes prediction when encoding video data. This more compact data may be quantized using a floating-to-integer representation quantization unit 516 to produce converted HDR' data 518. In this example HDR' data 518 is in an integer representation. The HDR' data is now in a format more suitable for compression by a hybrid video encoder (e.g., video encoder 200). The order of the processes depicted in FIG. 6 is given as an example, and may vary in other applications. For example, color conversion may precede the TF process. In addition, additional processing, e.g. spatial subsampling, may be applied to color components.

Figure 7:
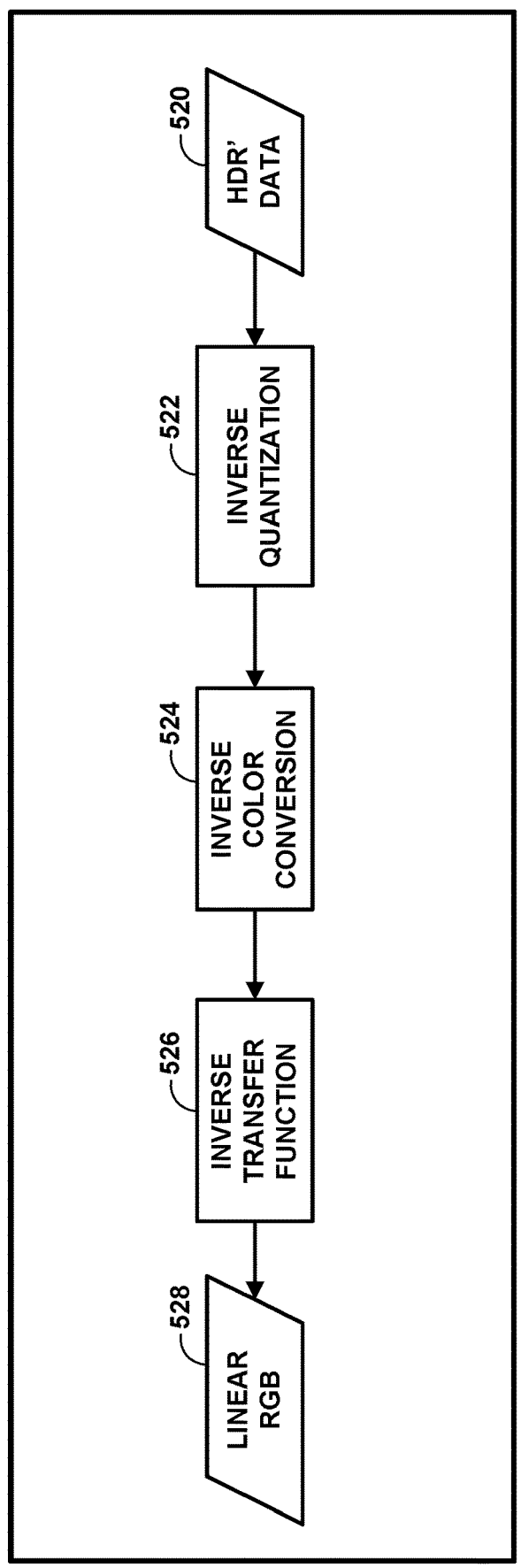
FIG. 7 is a conceptual diagram illustrating an example inverse HDR/WCG conversion.

FIG. 7 is a conceptual diagram illustrating an example inverse HDR/WCG conversion. The techniques of FIG. 7 may be performed by destination device 14 (which may be an example of video decoder 300). Converted HDR' data 520 may be obtained at destination device 14 through decoding video data using a hybrid video decoder (e.g., video decoder 300). A hybrid video decoder is a video decoder that utilizes prediction when decoding video data. Destination device 14 may inverse quantize HDR' data 520 through inverse quantization unit 522. Then an inverse color conversion process 524 may be applied to the inverse quantized HDR' data. The inverse color conversion process 524 may be the inverse of color conversion process 514. For example, the inverse color conversion process 524 may convert the HDR' data from a YCrCb format back to an RGB format. Inverse transfer function 526 may be applied to the data to add back the dynamic range that was compacted by transfer function 512 to recreate the linear RGB data 528.

The order of the techniques of FIGS. 6 and 7, is provided as an example, and the order may vary in real-world applications, e.g., color conversion may precede the TF module, as well as additional processing, e.g., spatial subsampling may be applied to color components. These three components of the techniques of FIGS. 6 and 7 are described in more detail below.

The techniques depicted in FIG. 6 are now be discussed in more detail. The TF is first described. Video encoder 200 may apply a TF to video data to compact the dynamic range of the video data and make it possible to represent the video data with a limited number of bits. This function is typically a one-dimensional (1D) non-linear function either reflecting an inverse of electro-optical transfer function (EOTF) of the end-user display as specified for SDR in Rec.709 or approximating the HVS perception to brightness changes as in the PQ TF specified in SMPTE-2084 for HDR. The inverse process of the opto-electronic transfer function (OETF) is the EOTF, which maps the code levels back to luminance. For example, video decoder 300 may apply an OETF that corresponds to the EOTF applied by video encoder 200.

Figure 8:
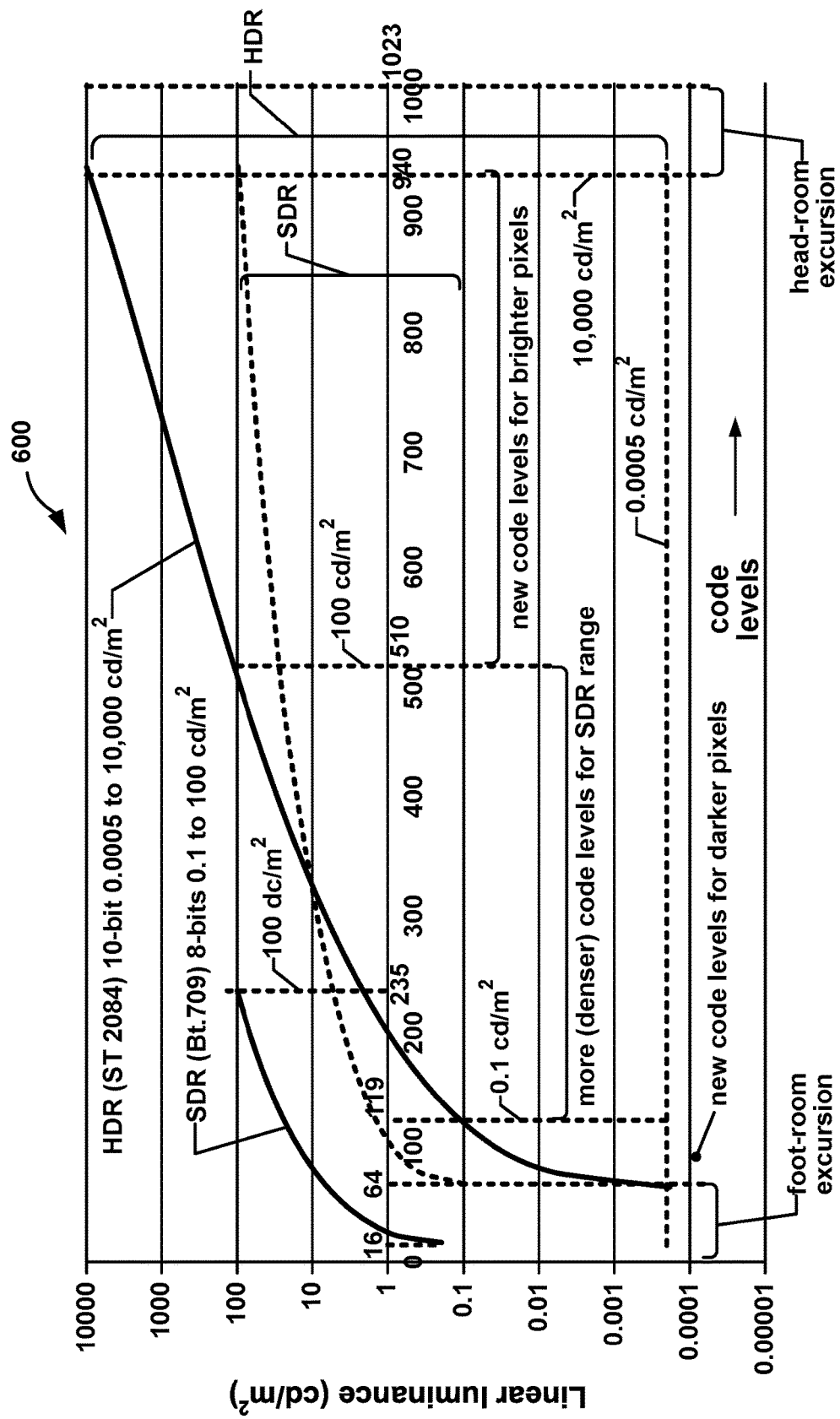
FIG. 8 is a conceptual diagram illustrating an example of electro-optical transfer functions (EOTFs).

FIG. 8 is a conceptual diagram illustrating an example of EOTFs. Graph 600 of FIG. 8 depicts code levels on the x-axis and units of linear luminance on the y-axis and example EOTFs.

The Specification, ST2084, defines the EOTF application as follows: TF is applied to normalized linear R, G, B values which results in nonlinear representations of R'G'B'. ST2084 defines normalization by NORM=10000, which is associated with a peak brightness of 10000 nits (cd/m2).

$$R' = \text{PQ\_TF}(\max(0, \min(R/\text{NORM}, 1))) \quad (1)$$

$$G' = \text{PQ\_TF}(\max(0, \min(G/\text{NORM}, 1)))$$

$$B' = \text{PQ\_TF}(\max(0, \min(B/\text{NORM}, 1)))$$

$$\text{with PQ\_TF}(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Figure 9:
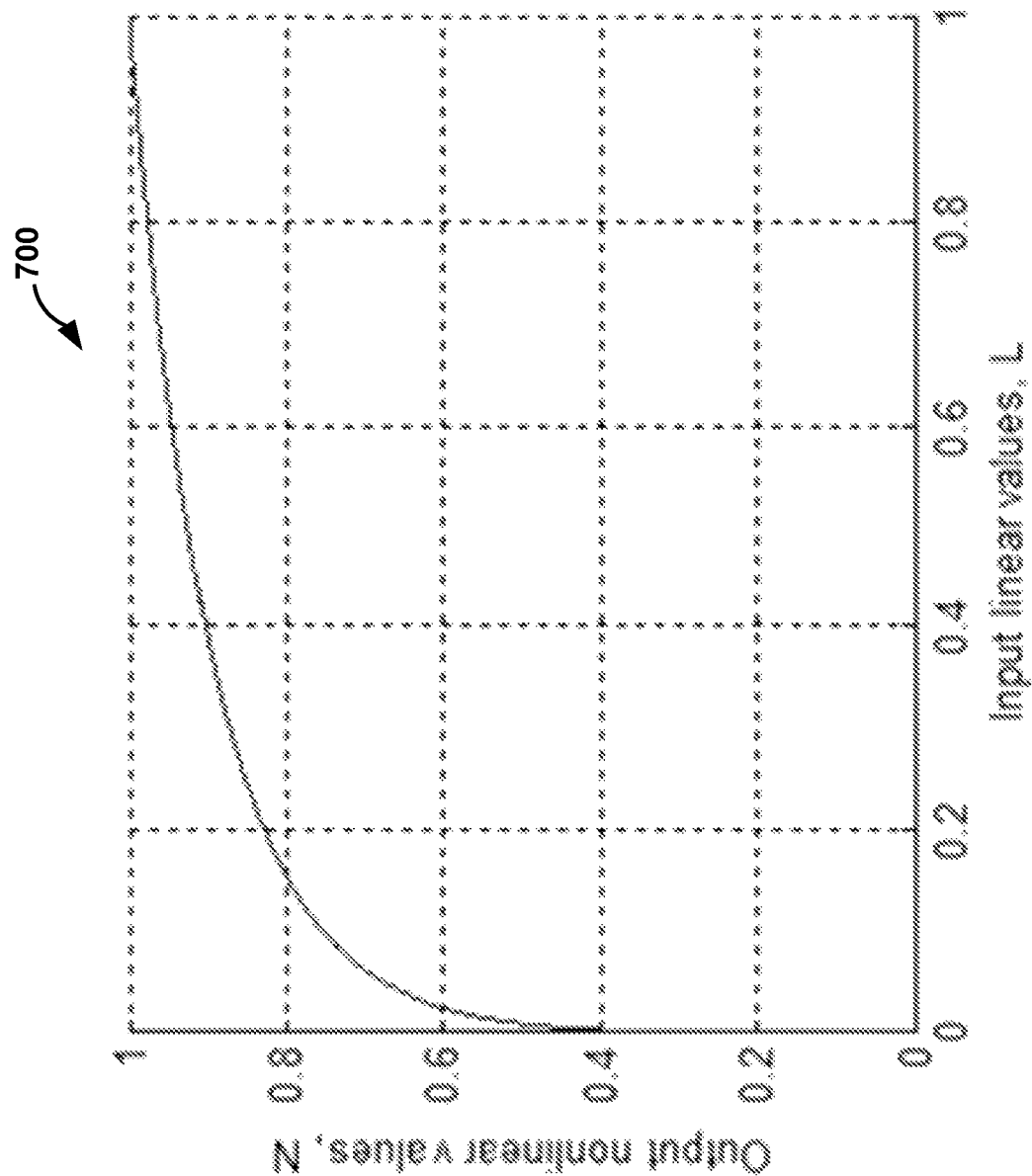
FIG. 9 is a conceptual diagram illustrating an example visualization of a perceptual quantizer (PQ) transfer function (TF).

FIG. 9 is a graphical diagram illustrating example normalized output nonlinear values based on normalized linear input values. Graph 700 of FIG. 9 depicts input values (linear color value) normalized to a range of 0 . . . 1 and normalized output values (nonlinear color value) using a PQ EOTF. As depicted in FIG. 9, 1 percent (0.01) (low illumination) of dynamical range of the input signal is converted to 50% (0.5) of dynamical range of output signal.

Typically, an EOTF is defined as a function with floating point accuracy. Thus, no error is introduced to a signal with this non-linearity if video decoder 300 applies the inverse TF of the corresponding OETF. The inverse TF (OETF) specified in ST2084 is defined as inversePQ function:

$$R = 10000 * \text{inversePQ\_TF}(R') \quad (2)$$

$$G = 10000 * \text{inversePQ\_TF}(G')$$

$$B = 10000 * \text{inversePQ\_TF}(B')$$

$$\text{with inversePQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of EOTF and OETF may provide a perfect reconstruction without errors. However, this representation is not optimal for streaming or broadcasting services because floating point representation may include the use of a relatively large number of bits when compared to a fixed point representation. A more compact representation using fixed bit accuracy of nonlinear R'G'B' data is described later herein.

Note, that EOTF and OETF are subjects of active research, and the TF utilized in some HDR video coding systems may be different from ST2084.

Color transform techniques are now described. RGB data is typically utilized as an input, since RGB data is typically produced by image capturing sensors. However, the RGB color space has high redundancy among RGB components and may not be optimal for compact representation. To achieve more compact and more robust representation, RGB components are typically converted to a more uncorrelated color space that is more suitable for compression, e.g., YCbCr. This color space separates the brightness in the form of luminance and color information in different un-correlated components.

With modern video coding systems, the typically used color space is YCbCr, as specified in ITU-R BT.709 or ITU-R BT.2020. The YCbCr color space in the BT.709 standard specifies the following conversion process from R'G'B' to Y'CbCr (non-constant luminance representation):

$$Y' = 0.2126 * R' + 0.7152 * G' + 0.0722 * B' \quad (3)$$
$$Cb = \frac{B' - Y'}{1.8556}$$
$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627 * R' + 0.6780 * G' + 0.0593 * B' \quad (5)$$
$$Cb = \frac{B' - Y'}{1.8814}$$
$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

It should be noted, that both color spaces remain normalized, therefore, for the input values normalized in the range 0 . . . 1 the resulting values may be mapped to the range 0 . . . 1. Generally, color transforms implemented with floating point accuracy provide perfect reconstruction, thus this process may be lossless.

Quantization (or fixed point conversion) is now described in more detail. All processing stages described above are typically implemented in floating point accuracy representation, and thus may be considered lossless. However, floating point accuracy can be considered expensive for most consumer electronics applications. Input data in a target color space may be converted to a target bit-depth fixed point accuracy and thereby save bandwidth and memory. Certain studies show that 10-12 bits accuracy in combination with the PQ TF is sufficient to provide HDR data of 16 f-stops with distortion below the Just-Noticeable Difference. Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in a target color space, such as YCbCr, is shown below. Input values YCbCr represented in floating point accuracy may be converted into a signal of fixed bit-depth $BitDepth_Y$ for the Y value and BitDepthc for the chroma values (Cb, Cr).

$$D_Y = \text{Clip1}_Y(\text{Round}((1 \ll (\text{BitDepth}_Y - 8)) * (219 * Y' + 16)))$$

$$D_{Cb} = \text{Clip1}_C(\text{Round}((1 \ll (\text{BitDepth}_C - 8)) * (224 * Cb + 128)))$$

$$D_{Cr} = \text{Clip1}_C(\text{Round}((1 \ll (\text{BitDepth}_C - 8)) * (224 * Cr + 128))) \quad (7)$$

with
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
$\text{Clip1}_Y(x)=\text{Clip3}(0, (1 \ll \text{BitDepth}_Y)-1, x)$
$\text{Clip1}_C(x)=\text{Clip3}(0, (1 \ll \text{BitDepthc})-1, x)$
Clip3(x,y,z)=x if z<x, y if z>y, z otherwise In the document, Dynamic Range Adjustment SEI to enable High Dynamic Range video coding with Backward-Compatible Capability, D. Rusanovskyy, A. K. Ramasubramonian, D. Bugdayci, S. Lee, J. Sole, M. Karczewicz, VCEG document COM16-C 1027-E, September 2015, the authors proposed to implement dynamic range adjustment (DRA) as a piece-wise linear function f(x) that is defined for a group of non-overlapped dynamic range partitions (ranges) {Ri} of input value x, were i is an index of the range with range of 0 to N−1, inclusive, and where N is the total number of ranges {Ri} utilized for defining the DRA function. Assuming that ranges of the DRA are defined by a minimum and a maximum x value that belongs to the range Ri, e.g. [$x_i$, $x_{i+1}-1$], where $x_i$ and $x_{i+1}$ denote minimum values of the ranges $R_i$ and $R_{i+1}$, respectively. Applied to the Y color component of the video (luma), DRA function Sy is defined through a scale $S_{y,i}$ and offset $O_{y,i}$ which are applied to every $x \in [x_i, x_{i+1}-1]$, thus $S_y = \{S_{y,i}, O_{y,i}\}$.

Thus, for any Ri, and every $x \in [x_i, x_{i+1}-1]$, the output value X is calculated as follows:

$$X = S_{y,i} * (x - O_{y,i}) \quad (8)$$

For the inverse DRA mapping process for the luma component Y conducted at the decoder (e.g., video decoder 300), the DRA function Sy is defined by inverse of scale $S_{y,i}$ and offset $O_{y,i}$ values which are applied to every $X \in [X_i, X_{i+1}-1]$.

Thus, for any Ri, and every $X \in [X_i, X_{i+1}-1]$, reconstructed value x is calculated as follows:

$$x = X/S_{y,i} + O_{y,i} \tag{9}$$

The forward DRA mapping process (conducted by video encoder 200) for chroma components Cb and Cr is defined as follows: an example is given with term "u" denoting sample of Cb color component that belongs to the range Ri, $u \in [u_i, u_{i+1}-1]$, thus $S_u = \{S_{u,i}, O_{u,i}\}$:

$$u = S_{u,i} * (u - O_{y,i}) + \text{Offset}, \tag{10}$$

where Offset is equal to $2^{(bitdepth-1)}$ and denotes the bi-polar Cb, Cr signal offset.

The inverse DRA mapping process conducted at the decoder, e.g., video decoder 300, for chroma components Cb and Cr is defined as follows: An example is given with U denoting a sample of remapped Cb color components which belongs to the range Ri, $U \in [U_i, U_{i+1}-1]$:

$$u = (U - \text{Offset})/S_{u,i} + O_{y,i} \tag{11}$$

where Offset is equal to $2^{(bitdepth-1)}$ and denotes the bi-polar Cb, Cr signal offset.

Luma-driven chroma scaling (LCS) is now described. LCS was initially proposed in JCTVC-W0101 HDR CE2: Report on CE2.a-1 LCS, A. K. Ramasubramonian, J. Sole, D. Rusanovskyy, D. Bugdayci, M. Karczewicz. In that paper, a technique to adjust chroma information, e.g. Cb and Cr, by exploiting brightness information associated with the processed chroma sample was disclosed. Similar to the DRA approach discussed above, the LCS proposal was to apply to a chroma sample, a scale factor $S_u$ for Cb and $S_v$ for Cr. However, instead of defining DRA function as piece-wise linear function $S_u = \{S_{u,i}, O_{u,i}\}$ for a set of ranges $\{R_i\}$ accessible by chroma value u or v as in Equations (8) and (9), the LCS approach proposed to utilize a luma value Y to derive a scale factor for a chroma sample. Video encoder 200 may perform forward LCS mapping of the chroma sample u (or v) through the following formula:

$$U = S_{u,i}(Y) * (u - \text{Offset}) + \text{Offset} \tag{12}$$

Video decoder 300 may perform the inverse LCS process conducted through the following formula:

$$u = (U - \text{Offset})/S_{u,i}(Y) + \text{Offset} \tag{13}$$

In more detail, for a given pixel located at (x, y), chroma samples Cb(x, y) or Cr(x, y) may be scaled with a factor derived from the pixel's LCS function $S_{Cb}$ (or $S_{Cr}$) accessed by the pixel's luma value Y'(x, y).

With the forward LCS, for chroma samples, Cb (or Cr) values, and their associated luma value Y' may be an input to the chroma scale function $S_{Cb}$ (or $S_{Cr}$) and Cb or Cr may be converted into Cb' and Cr' as shown in Equation 14. Video decoder 300 may apply the inverse LCS, and reconstructed Cb' or Cr' may be converted to Cb, or Cr as it shown in Equation (15).

$$Cb'(x, y) = S_{Cb}(Y'(x, y)) * Cb(x, y), \tag{14}$$

$$Cr'(x, y) = S_{Cr}(Y'(x, y)) * Cr(x, y)$$

-continued $$Cb(x, y) = \frac{Cb'(x, y)}{S_{Cb}(Y'(x, y))} \tag{15}$$

$$Cr(x, y) = \frac{Cr'(x, y)}{S_{Cr}(Y'(x, y))}$$

The values $S_{Cb}(Y'(x,y))$ and $S_{Cr}(Y'(x,y))$ denote luma adjusted chroma DRA scale values.

Figure 10:
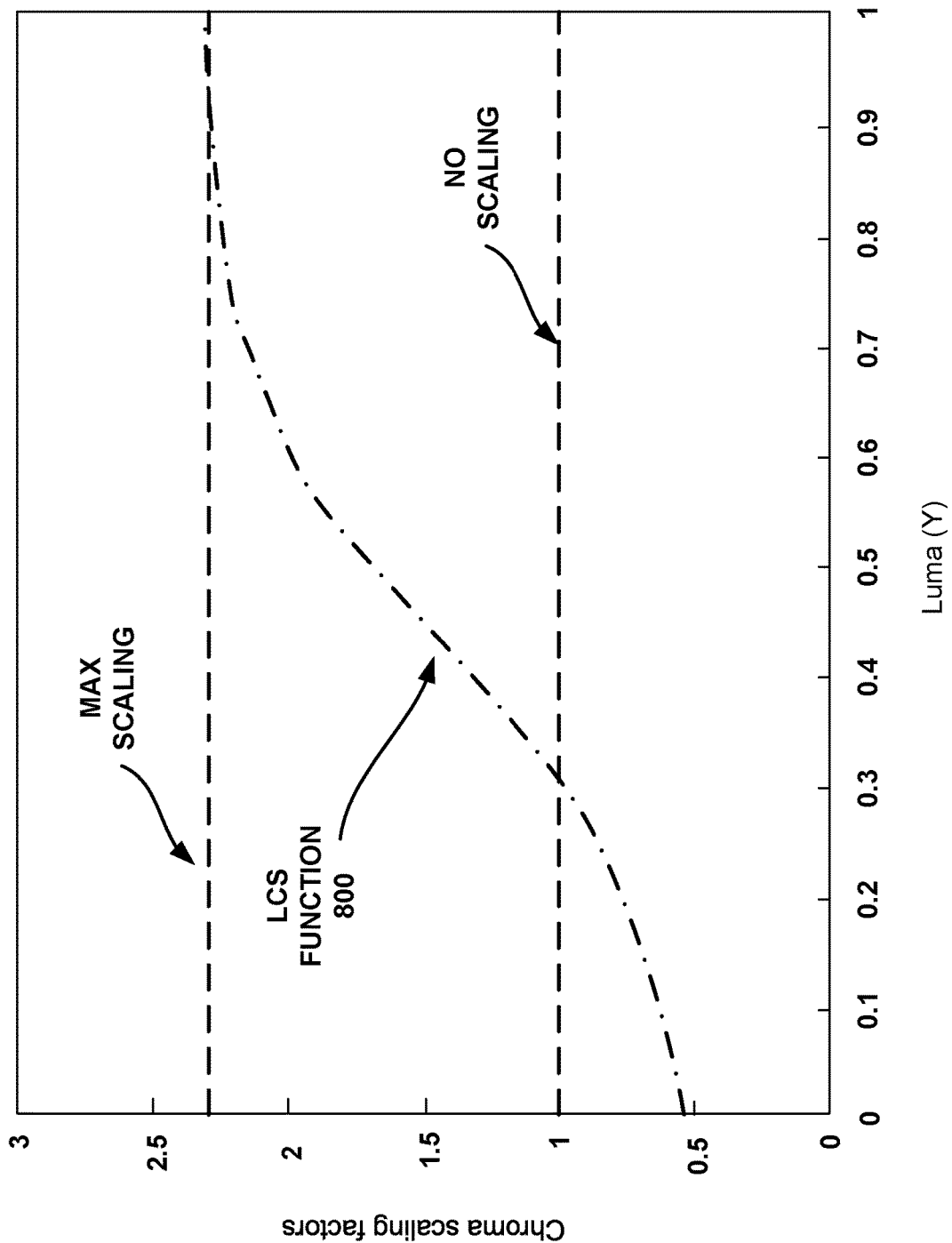
FIG. 10 is a conceptual diagram illustrating an example of a luma-driven chroma scaling (LCS) function.

FIG. 10 is a graphical diagram illustrating an example of an LCS function. With LCS function 800 in the example of FIG. 10, chroma components of pixels with smaller values of luma are multiplied with smaller scaling factors.

The relationship between DRA sample scaling and quantization parameters is now described. To adjust a compression ratio, block transform based video coding schemes, such as HEVC and VVC, utilize a scalar quantizer which is applied to transform coefficients. The scalar is controlled with a Quantization Parameter (QP) with the relationship between the QP and the scalar quantizer being defined as following:

$$\text{scale} = \exp(QP/6) * \log(2.0)) \tag{16}$$

In some examples, scale may also be referred to as scaler. The inverse function defines the relationship between scalar quantizer and QP of HEVC as follows:

$$QP = \log 2(\text{scale}) * 6; \tag{17}$$

DRA, which effectively scales the pixel data and taking into consideration transform properties, can be mapped for a large class of signals to the scale applied in the transform domain. Thus, the following relationship is defined:

$$dQP = \log 2(\text{scale}DRA) * 6; \tag{18}$$

where dQP is an approximate QP offset (e.g., introduced by HEVC) by deploying DRA on the input data.

DRA scale compensation for decoder QP handling is now described. DRA scales for color components may be adjusted to compensate QP handling in a video codec.

Parameters of DRA for 3 color components (e.g., Y, Cb, Cr) may be defined through the following variables as described above:

$$DRA_y = \{S_{y,i}, O_{y,i}\}$$

$$DRA_{Cb} = \{S_{Cb,i}, O_{Cb,i}\}$$

$$DRA_{Cr} = \{S_{Cr,i}, O_{Cr,i}\} \tag{19}$$

Video encoder 200 may signal DRA parameters relating to pixel processing through the coded bitstream and video decoder 300 may derive the DRA parameters from syntax elements signaled in the bitstream. These DRA parameters are further adjusted by taking into consideration information describing quantization of the transform coefficients.

$$DRA'_{Cb} = \text{fun}(DRA_{Cb}, QPx)$$

$$DRA'_{Cr} = \text{fun}(DRA_{Cr}, QPx), \tag{20}$$

where QPx are QP adjustments or manipulations conducted by a codec for a given block of pixels and signaled to the decoder in the bitstream or provided to the decoder as side information, e.g., as pre-tabulated information and fun( . . . ) represents some functional dependency.

The output of this process are adjusted DRA parameters ($DRA'_{Cb}$, $DRA'_{Cr}$) which are to be applied to the decoded samples ($Cb_{dec}$, $Cr_{dec}$).

$$Cb_o = \text{fun}(DRA'_{Cb}, Cb_{dec})$$

$$Cr_o = \text{fun}(DRA'_{Cr}, Cr_{dec}) \tag{21}$$

QP information may be adjusted to reflect the impact of DRA applied to pixels. For example, video decoder 300 may alter QP information to reflect the impact of the DRA applied to pixels of the decoded picture.

$$QP'_{Cb}=\text{fun}(QPx,DRA_{Cb})$$

$$QP'_{Cr}=\text{fun}(QPx,DRA_{Cr}) \quad (22)$$

where QPx are QP parameters derived by video decoder 300 without taking into consideration scaling implemented by DRA processing to current processed pixels.

The output of this process may be adjusted QP values ($Q'_y$, $QP'_{Cb}$, $QP'_{Cr}$) which are utilized in a decision making process by video decoder 300. In some examples, only a subset of the techniques in the decoding algorithm will use the adjusted QP in the decision making process.

How DRA scales compensate for the chroma QP shift table is now discussed. Video decoder 300 may derive parameters mentioned below based on local QP information derived from syntax elements of the decoded bitstream and may further alter the parameters based on side information available to video decoder 300.

Examples of such processing are discussed in the HEVC specification (which is available at https://www.itu.int/rec/T-REC-H.265) clause 8.6.1:

The variables $qP_{Cb}$ and $qP_{Cr}$ are derived as follows:

$$qPi_{Cb}=\text{Clip3}(-QpBd\text{Offset}_c, 57, Qp_Y+pps\_cb\_qp\_\text{off-set}+slice\_cb\_qp\_\text{offset}+CuQ\,p\text{Offset}_{Cb}) \quad (8\text{-}257)$$

$$qPi_{Cr}=\text{Clip3}(-QpBd\text{Offset}c, 57, Qp_Y+pps\_cr\_qp\_\text{off-set}+slice\_cr\_qp\_\text{offset}+CuQp\,\text{Offset}_{Cr}) \quad (8\text{-}258)$$

If ChromaArrayType is equal to 1, the variables $qP_{Cb}$ and $qP_{Cr}$ are set equal to the value of Qpc as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb}=qP_{Cb}+QpBd\text{Offset}c \quad (8\text{-}259)$$

$$Qp'_{Cr}=qP_{Cr}+QpBd\text{Offset}c \quad (8\text{-}260)$$

FIG. 11 is a conceptual diagram illustrating a table describing the specification of QpC as a function of qPi for ChromaArrayType equal to 1. For example, table 810 of FIG. 11 may be Table 8-10 of the HEVC specification.

In such examples, DRA scale parameters for chroma components may be altered to reflect the QP shift introduced by such processing. The following example is given for the Cb component. Derivations for Cr components are similar.

Video decoder 300 may derive a chroma quantization parameter for Cb component from Table 8-10 achievable with QP information. Video decoder 300 may estimate:

$$\text{estimate}QP1=qPcb+QpBdPffsetC$$

$$\text{updated}QP1=\text{fun}(\text{Table8-10},\text{estimate}QP1) \quad (23)$$

$$\text{shift}QP1=\text{updated}QP1-\text{estimate}QP1;$$

A variable updatedQP1 may be further used in the decoding process and shiftQP1 provides estimates for impact on the QP introduced by Table 8-10.

To harmonize pixel-level quantization conducted by DRA and QP handling in the decoder (e.g., video decoder 300), the DRA scaling function is altered as follows:

$$\text{estimate}QP2=qPcb+QpBdPffsetC+\text{scale2}QP(DRACb) \quad (24)$$

where scale2QP(DRACb) conducts conversion from Scale to QP, similarly as shown in Equation (18).

$$\text{updated}QP2=\text{fun}(\text{Table8-10},\text{estimate}QP2) \quad (25)$$

$$\text{shift}QP2=\text{updated}QP2-\text{estimate}QP2;$$

In some examples, such as in the case of cross-component DRA implementation (e.g., LCS), Equation (24) will include a QP offset value estimated from the DRA scale of the Y component and additional QP offset values estimated from the chromaticity scale (addnDRACb Scale) used to produce DRA for Cb component. E.g., $$\text{estimate}QP2=qPcb+QpBdPffsetC+\text{scale2}QP(DRAY)+\text{scale2}QP(\text{addn}DRACb\text{Scale})$$

A variable updatedQP2 provides an estimate for QP in the case where DRA would be conducted through transform domain scaling and shiftQP2 provides an estimate of the impact on the QP introduced by Table 8-10.

In some circumstances, estimated shiftQP1 would not be equal to shiftQP2. To compensate for this difference, scales of DRA can be altered with a multiplicator as follows:

$$\text{shiftScale}=Qp2\text{Scale}(\text{shift}QP2-\text{shift}QP1)$$

$$DRACb'=\text{shiftScale}*DRACb \quad (26)$$

where function Qp2Scale converts QP variable to associated quantizer scale as shown in Eq. 26.

The output of this process may be an adjusted DRA scale which is applied to the decoded samples $Cb_{dec}$.

In some examples, the output of the scale to the QP conversion function scale2QP(DRACb) and the resulting estimateQP2 are non-integer values. In order to address elements of Table 8-10, input and output QP values to Table 8-10 may be interpolated between integer entries as follows:

$$qp1=\text{fun}(\text{Table8-10},(\text{Int})(\text{estimate}QP2));$$

$$qp2=\text{fun}(\text{Table8-10},(\text{Int})(\text{estimate}QP2+1.0)); \quad (27)$$

$$\text{shift}QP2=qp1+(qp2-qp1)*(\text{estimate}QP2-(\text{Int})(\text{estimate}QP2));$$

where (Int)(x) denotes an integer component of x.

In yet another example, entries of Table 8-10 (or similar tabulated information) may be defined through an analytical function, or may be explicitly signaled in the bitstream.

In yet another example, the shiftScale can be computed to compensate for the impact of Table8-10 shiftQP1 as follows:

$$\text{shiftScale}=Qp2\text{Scale}(\text{shift}QP1)$$

In some examples, a QP index for initializing Equations 23 and 24 may be signaled through the bitstream in order to avoid parsing and processing dependencies.

Harmonization of DRA scaling (implementing pixel level quantization) and transform domain quantization of the hybrid video codec utilizes conversion of values of scale/offset to the quantization parameter (QP) and the inverse QP. This process involves usage of log and exponential expressions that are expensive to implement in computational platforms, such as a video codec, with integer arithmetic. Such expressions include:

$$\text{scale}=\exp(QP/6*\log(2.0)) \quad (28)$$

$$QP=\log2(\text{scale})*6; \quad (29)$$

wherein log(·) is the natural logarithm.

This disclosure describes techniques and constraints for more efficient implementation of DRA with harmonized pixel/transform domain quantization.

In some examples, this disclosure describes introducing bitstream constraints to the DRA specification that allow more efficient implementation of DRA. In some examples, this disclosure describes introducing integer approximation of exponential and log functions, e.g., through a limited number of tabulated values. In some examples, this disclosure describes utilizing sub-sampled representations of exponential and/or logarithmic functions. In some examples, this disclosure describes utilizing linear interpolation techniques to approximate exponential and/or log functions to estimate scale or QP values that may not be exactly tabulated (e.g., that do not appear in a table). In some examples, this disclosure describes specifying the accuracy of integer representation required for conversion between scale and QP values.

For example, video decoder 300 may determine a luma adjusted chroma DRA scale value based on a luma DRA scale value; determine a chroma QP based on the luma adjusted chroma DRA scale, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value. In this manner, mathematical operations that would otherwise be implemented as logarithmic and/or exponential operations are replaced with approximations of the operations, which may reduce expense and save processing power.

An example of specification text follows. Details within the example of the specification text may be changed and still fall within the scope of this disclosure.

Derivation of adjusted chroma DRA scales

Inputs to this process are: variable denoting luma scales, lumaScale, and chroma component index cIdx. Output of this process is: a variable denoting chroma scales, chromaScale.

Variables scaleDra and scaleDraIlorm are derived as follows:
scaleDra=lumaScale*((cIdx==0)?dra_cb_scale_value: dra_cr_scale_value)
scaleDraIlorm=(scaleDra+(1<<8))>>9 scaleDra denotes a luma adjusted chroma DRA scale value which is determined based on the luma DRA scale value lumaScale. dra_cb_scale_value and dra_cr_scale_value denote initial chroma (Cb and Cr, respectively) DRA scale values, e.g., without consideration of the luma DRA scaling effects.

The variable IndexScaleQP is derived by invoking clause 8.9.5 of MPEG-5 EVC, ISO/IEC 23094-1:2020 Information Technology—General Video Coding—Part 1: Essential Video Coding (available at https://www.iso.org/standard/57797.html) for input value inValue set equal to scaleDraIlorm, scaleQp array and the size of the scaleQp array set equal to 54 as input.

Variable qpDraInt is derived as follows:

qpDraInt=2*IndexScaleQP−60

The variables qpDraInt and qpDraFrac are derived as follows:

tableNum=scale*Drallorm*−scale*Qp*[IndexScale*QP*]

tableDelta=scale*Qp*[IndexScale*QP*+1]−scale*Qp*[IndexScale*QP*]

scaleQp is a table that provides an integer approximation of the conversion from the the luma adjusted chroma DRA scale value to a chroma quantization parameter according to Equation 29.

When tableNum is equal to 0, the variable qpDraFrac is set equal to 0, and the variable qpDraInt is decreased by 1, otherwise the variables qpDraInt and qpDraFrac are derived as follows:

qpDraFrac=(tableNum<<10)/tableDelta qpDraInt+=qpDraFrac>>9 qpDraFrac=(1<<9)−qpDraFrac %(1<<9)

qpDraInt and qpDraFrac denote integer and fractional components, respectively, of a chroma QP determined based on the luma adjusted chroma DRA scale scaleDra.

idx0=Clip3(−*QpBd*Offset*c*,57,*dra_table_idx*−*qpDraInt*)

idx1=Clip3(−*QpBd*Offset*c*,57,*dra_table_idx*−*qpDraInt*+1)

dra_table_idx may denote a starting position in the chroma QP table as parsed from the bitstream.

*Qp*0=Chroma*Qp*Table[*cIdx*][*idx*0].

*Qp*1=Chroma*Qp*Table[*cIdx*][*idx*1].

qpDraIntAdj=((*Qp*1−*Qp*0)*qpDraFrac)>>9 qpDraFracAdj=qpDraFrac−(((*Qp*1−*Qp*0) *qpDraFrac) %(1<<9))

The indices idx0 and idx1 are determined based on the integer component qpDraInt of the chroma QP and used to index the ChromaQpTable to determine an integer chroma QP offset. qpDraIntAdj may denote an integer chroma QP offset. qpDraFracAdj may denote a fractional chroma QP offset.

*dra*Chroma*Qp*Shift=chroma*Qp*Table[*cIdx*][*dra_table_idx*]−*Qp*0−*qpDraIntAdj*−*qpDraInt*

If qpDraFracAdj is smaller than 0, draChromaQpShift and qpDraFracAdj are derived as follows:

*dra*Chroma*Qp*Shift=*dra*Chroma*Qp*Shift−1 qpDraFracAdj=(1<<9)+qpDraFracAdj idx0=clip3(0,24,*dra*Chroma*Qp*Shift+12)

idx1=clip3(0,24,*dra*Chroma*Qp*Shift+12−1)

idx2=clip3(0,24,*dra*Chroma*Qp*Shift+12+1)

*dra*ChromaScaleShift=*qp*Scale[*idx*0]

When draChromaQpShift is less than 0, variable draChromaScaleShiftFrac is derived as follows:

*dra*ChromaScaleShiftFrac=*qp*Scale[*idx*0]−*qp*Scale[*idx*1]

otherwise, variable draChromaScaleShiftFrac is derived as follows:

*dra*ChromaScaleShiftFrac=*qp*Scale[*idx*2]−*qp*Scale[*idx*0]

Variable draChromaScaleShift is modified as follows:

*dra*ChromaScaleShift=*dra*ChromaScaleShift+ (*dra*ChromaScaleShiftFrac**qpDraFracAdj*+ (1<<8))>>9

Output variable chromaScale is derived as follows:

$$\text{chromaScale} = (\text{scaleDra} * \text{draChromaScaleShift}) + (1<<17))>>18$$

draChromaScaleShift denotes a DRA chroma scale adjustment value which is used to modify the luma adjusted chroma DRA scale value scaleDra to derive a modified chroma scale chromaScale.

The entries of scaleQp and qpScale tables are initialized as follows:

scaleQp={0, 1, 1, 1, 1, 1, 2, 2, 3, 4, 4, 6, 7, 9, 11, 14, 18, 23, 29, 36, 45, 57, 72, 91, 114, 144, 181, 228, 287, 362, 456, 575, 724, 912, 1149, 1448, 1825, 2299, 2896, 3649, 4598, 5793, 7298, 9195, 11585, 14596, 18390, 23170, 29193, 36781, 46341, 58386, 73562, 92682, 116772} qpScale={128, 144, 161, 181, 203, 228, 256, 287, 322, 362, 406, 456, 512, 574, 645, 724, 812, 912, 1024, 1149, 1290, 1448, 1625, 1825, 2048} chroma_qp_table_present_flag equal to 1 specifies that chroma QP mapping tables ChromaQpTable are signaled and used to derive Qpc instead of derivation defined by Table 8-19 as shown in FIG. 12.

chroma_qp_table_present_flag equal to 0 specifies that the chroma QP mapping tables are not signaled and that Table 8-19 is used for deriving the chroma QP values Qpc. FIG. 12 is a conceptual diagram illustrating a table describing the specification of QpC as a function of qPi (sps_iqt_flag==1), chromaQpTable[ ] for chroma_qp_table_present_flag equal to 0. In some examples, table 819 of FIG. 12 may represent Table 8-19.

| | Descriptor |
|---|---|
| dra_data( ) { | |
|   dra_descriptor1 | u(4) |
|   dra_descriptor2 | u(4) |
|   dra_number_ranges_minus1 | ue(v) |
|   dra_equal_ranges_flag | u(1) |
|   dra_global_offset | u(v) |
|   if( dra_equal_ranges_flag ) | u(1) |
|     dra_delta_range[ 0 ] | u(v) |
|   else | |
|     for( j = 0; j <= dra_number_ranges_minus1; j++ ) | |
|       dra_delta_range[ j ] | u(v) |
|   for( j = 0; j <= dra_number_ranges_minus1; j++ ) | |
|     dra_scale_value[ j ] | u(v) |
|   dra_cb_scale_value | u(v) |
|   dra_cr_scale_value | u(v) |
|   dra_table_idx | ue(v) |
| } | | dra_descriptor1 specifies the number of bits used to represent the integer part of the DRA scale parameters signaling. The value of dra_descriptor1 shall be in the range of 0 to 15, inclusive. In the current version of the specification value of syntax element dra_descriptor1 is restricted to 4; other values are reserved for future use.

dra_descriptor2 specifies the number of bits used to represent the fractional part of the DRA scale parameters signaling and the reconstruction process. The value of dra_descriptor2 shall be in the range of 0 to 15, inclusive. In the current version of the specification value of syntax element dra_descriptor2 is restricted to 9; other values are reserved for future use.

The variable numBitsDraScale is derived as follows:

$$\text{numBitsDraScale} = \text{dra\_descriptor1} + \text{dra\_descriptor2}$$

It is a requirement of bitstream conformance that the value of numBitsDraScale shall be greater than 0.

dra_number_ranges_minus1 plus 1 specifies the number of ranges signaled to describe the DRA table. The value of dra_number_ranges_minus1 shall be in the range of 0 to 31, inclusive.

dra_equal_ranges_flag equal to 1 specifies that the DRA table is derived using equal-sized ranges, with size specified by the syntax element dra delta range[0]. dra_equal_ranges flag equal to 0 specifies that the DRA table is derived using dra_number_ranges, with the size of each of the ranges specified by the syntax element dra_delta_range[j].

dra_global_offset specifies the starting codeword position utilized to derive DRA table and initializes the variable inDraRange[0] as follows:

$$\text{inDraRange}[0] = \text{dra\_global\_offset}$$

The number of bits used to signal dra_global_offset is BitDepth$_Y$ bits.

dra_delta_range[j] specifies the size of the j-th range in codewords which is utilized to derive the DRA table. The value of dra_delta_range[j] shall be in the range of 1 to (1<<BitDepth$_Y$)−1, inclusive.

The variable inDraRange[j] for j in the range of 1 to dra_number_ranges_minus1+1, inclusive, is derived as follows:

$$\text{inDraRange}[j] = \text{inDraRange}[j-1] + (\text{dra\_equal\_ranges\_flag}==1)?\text{dra\_delta\_range}[0]: \text{dra\_delta\_range}[j-1]$$

It is a requirement of bitstream conformance that inDraRange[j] shall be in the range 0 to (1<<BitDepth$_Y$)−1, inclusive.

dra_scale_value[j] specifies the DRA scale value associated with j-th range of the DRA table. The number of bits used to signal dra scale value[j] is equal to numBitsDraScale.

dra_cb_scale_value specifies the scale value for chroma samples of the Cb component utilized to derive the DRA table. The number of bits used to signal dra_cb_scale_value is equal to numBitsDraScale.

dra_cr_scale_value specifies the scale value for chroma samples of the Cr component utilized to derive the DRA table. The number of bits used to signal dra_cr_scale_value is equal to numBitsDraScale.

The values of dra scale value[j] for j in the range of 0 to dra_number_ranges_minus1, inclusive, dra cb scale value and dra_cr_scale_value shall not be equal to 0. In the current version of the specification, the value of syntax elements dra scale value[j], dra_cb_scale_value and dra_cr_scale_value shall be less than 4<<dra_descriptor2. other values are reserved for future use.

dra_table_idx specifies the access entry of the ChromaQpTable utilized to derived the chroma scale values. The value of dra_table_idx shall be in the range of 0 to 57, inclusive.

The variable numOutRangesL is set equal to dra_number_ranges_minus1+1. The variable outRangesL[adaptation_parameter_set_id][0] is set to 0, the variable outRangesL[i], for i in the range of 0 to numOutRangesL, inclusive, is derived as follows.

$$\text{outDelta} = \text{dra\_scale\_value}[i-1] * (\text{inDraRange}[i] - \text{inDraRange}[i-1]) \text{outRangesL[adaptation\_parameter\_set\_id]}[i] = \text{outRangesL[adaptation\_parameter\_set\_id]}[i-1] + \text{outDelta}$$

The variables denoting DRA scale and offset values, InvLumaScale[adaptation_parameter_set_id][i], and DraOffsets[adaptation_parameter_set_id][i] respectively, for i in the range of 0 to dra_number_ranges_minus1, inclusive, are derived as follows:

invScalePrec=18

$invScale=((1<<invScalePrec)+(dra\_scale\_val[i]>>1))/dra\_scale\_val[i]InvLumaScale[adaptation\_parameter\_set\_id][i]$=invScale
diffVal=outRangesL[i+1]*invScale DraOffsets[adaptation_parameter_set_id][i]=((inDraRange[i]<<invScalePrec)−diffVal+(1<<(dra_descriptor2−1)))>>dra_descriptor2

The variable outRangesL[i], for i in the range of 0 to numOutRangesL, inclusive, are modified as follows:

outRangesL[adaptation parameter set id][i]=(outRangesL[adaptation_parameter_set_id][i]+(1<<(dra_descriptor2−1)))>>dra_descriptor2

The process of deriving output chroma DRA parameters in clause 8.9.7 of MPEG-5 EVC, ISO/IEC 23094-1:2020 Information Technology—General Video Coding—Part 1: Essential Video Coding (available at https://www.iso.org/standard/57797.html) is invoked with array of luma scale values dra scale val[ ], array of inverse luma scale value InvLumaScale[ ][ ], array of luma range values outRangesL[ ], and chroma index cIdx as inputs and array of chroma scale values outScalesC[ ][ ], array of chroma offset values outOffsetsC[ ][ ] and array of chroma range values outRangesC[ ][ ] as outputs.

End of example specification text.

An example software implementation follows. Details within the example software implementation may be changed and still fall within the scope of this disclosure.

```
int eve_correctLocalChromaScale(WCGDDRAControl *p_DRAMapping, int intScaleLumaDra, int chId)
        {
            int l_array[NUM_CHROMA_QP_OFFSET_LOG];
       memcpy(l_array, g_dra_chroma_qp_offset_tbl,
NUM_CHROMA_QP_OFFSET_LOG * sizeof(int));
            int SCALE_OFFSET = 1 <<QC_SCALE_NUMFBITS;
            int TABLE0_SHIFT = NUM_CHROMA_QP_SCALE_EXP >> 1;
            int outChromaScale = 1;
            int localQPi;
            int Qp0, Qp1;
            int scaleDraInt = 1;
            int qpDraFrac = 0;
scaleDraInt =(chId == 1) ?p_DRAMapping->m_intScaleCbDRA * intScaleLumaDra:
p_DRAMapping->m_intScaleCrDRA * intScaleLumaDra;
       int localChromaQPShift1 = p_DRAMapping-
>m_chromaQPModel.m_baseLumaQP - (evc_getScaledChromaQP2(chId,
p_DRAMapping->m_chromaQPModel.m_baseLumaQP));
            int qpDraInt =0;
            int OutofRange =− 1;
            int scaleDraInt9 = (scaleDraInt + (1 <<8)) >>9;
       int IndexScaleQP = evc_getDraRangeIdx_gen(p_DRAMapping, scaleDraInt9,
l_array, NUM_CHROMA_QP_OFFSET_LOG - 1);
            int interpolationNum = scaleDraInt9 - g_dra_chroma_qp_offset_tbl[IndexScaleQP];
            int interpolationDenom = g_dra_chroma_qp_offset_tbl[IndexScaleQP + 1] -
g_dra_chroma_qp_offset_tbl[IndexScaleQP];
            qpDraInt = 2 * IndexScaleQP - 60;
            if (interpolationNum == 0)
            {
              qpDraInt -= 1;
              qpDraFrac = 0;
            }
            else
            {
         qpDraFrac = SCALE_OFFSET * (interpolationNum << 1) / interpolationDenom;
              qpDraInt += qpDraFrac / SCALE_OFFSET; // 0
              qpDraFrac = SCALE_OFFSET - (qpDraFrac % SCALE_OFFSET);
            }
         localQPi = p_DRAMapping->m_chromaQPModel.m_baseLumaQP - qpDraInt;
         Qp0 = evc_getScaledChromaQP2(chId, EVC_CLIP3(-(6 * (BIT_DEPTH - 8)), 57,
localQPi));
         Qp1 = evc_getScaledChromaQP2(chId, EVC_CLIP3(-(6 * (BIT_DEPTH - 8)), 57,
localQPi + 1));
            int qpChDec = (Qp1 - Qp0) * qpDraFrac;
            int qpDraFracAdj = qpChDec % (1 << 9);
            int qpDraIntAdj = (qpChDec >> 9);
            qpDraFracAdj = qpDraFrac - qpDraFracAdj;
            int localChromaQPShift2 = localQPi - Qp0 - qpDraIntAdj;
            int draChromaQpShift = localChromaQPShift2 - localChromaQPShift1;
            if (qpDraFracAdj < 0)
            {
              draChromaQpShift -= 1;
              qpDraFracAdj = (1 << 9) + qpDraFracAdj;
            }
            int draChromaQpShift clipped = EVC_CLIP3(-12, 12, draChromaQpShift);
       int draChromaScaleShift = g_dra_exp_nom_v2[draChromaQpShift_clipped +
TABLE0_SHIFT];
            int draChromaScaleShiftFrac;
            if (draChromaQpShift >= 0)
         draChromaScaleShiftFrac = g_dra_exp_nom_v2 [EVC_CLIP3(-12, 12,
draChromaQpShift +1) [TABLE0_SHIFT] -
g_dra_exp_nom_v2[draChromaQpSHift_clipped + TABLE0_SHIFT];
```

```
    else
        draChromaScaleShiftFrac = g_dra_exp_nom_v2[draChromaQpShift_clipped +
TABLE0_SHIFT] - g_dra_exp_nom_v2[EVC_CLIP3(-12, 12, draChromaQpShift - 1)
+ TABLE0_SHIFT];
    outChromaScale = draChromaScaleShift + ((draChromaScaleShiftFrac *
qpDraFracAdj + (1 << (QC_SCALE_NUMFBITS - 1))) >> QC_SCALE_NUMFBITS);
        return (scaleDraInt * outChromaScale +(1 << 17)) >> 18;
    }
```

End of the example software implementation.

Figure 13:
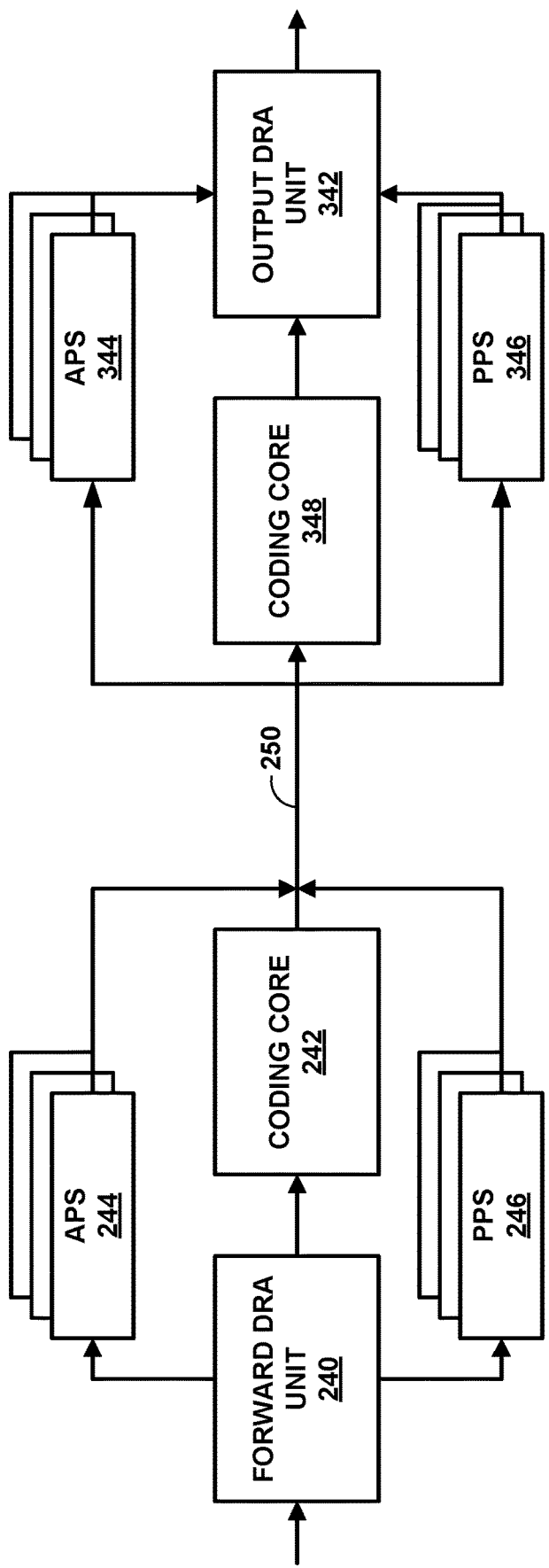
FIG. 13 is a block diagram of a video encoder and video decoder system including DRA units.

FIG. 13 is a block diagram of a video encoder and video decoder system including DRA units. A video encoder, such as video encoder 200, may include forward DRA unit 240 and coding core 242. In some examples, coding core 242 may include the units depicted in FIG. 2 and may function as described above with respect to FIG. 2. Video encoder 200 may also determine a plurality of adaptation parameter sets (APSs) 244 and a plurality of picture parameter sets (PPSs) 246 that may include information from forward DRA unit 240.

A video decoder, such as video decoder 300, may include coding core 348 and output DRA unit 342. In some examples, coding core 348 may include the units depicted in FIG. 3 and may function as described above with respect to FIG. 3. Video decoder 300 may also determine a plurality of APSs 344 and a plurality of PPSs 346 which may include information to be used by output DRA unit 342.

According to the techniques of this disclosure, output DRA unit 342 may determine a luma adjusted chroma DRA scale value based on a luma DRA scale value. Output DRA unit 342 may determine a chroma QP based on the luma adjusted chroma DRA scale value, wherein the chroma QP comprises an integer component and a fractional component. Output DRA unit 342 may determine an integer chroma QP offset based on the integer component of the chroma QP. Output DRA unit 342 may also determine a fractional chroma QP offset based on the fractional component of the chroma QP. Output DRA unit 342 may determine a DRA chroma scale adjustment value based on the integer chroma QP offset and the fractional chroma QP offset, and process the video data based on the DRA chroma scale adjustment value.

Figure 14:
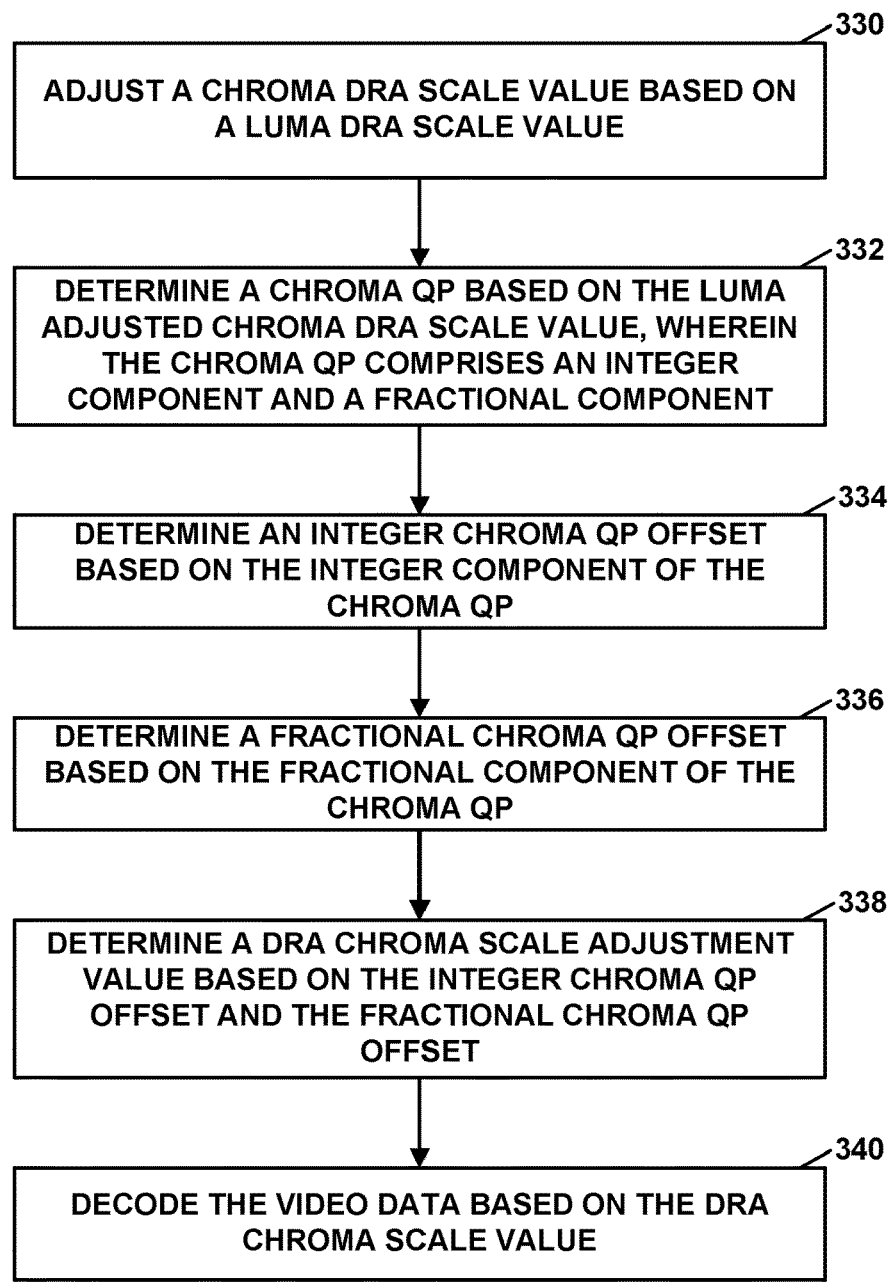
FIG. 14 is a flowchart illustrating example DRA chroma scale techniques according to this disclosure.

FIG. 14 is a flowchart illustrating example DRA chroma scale techniques according to this disclosure. Video decoder 300 may determine a luma adjusted chroma DRA scale value based on a luma DRA scale value (330). For example, video decoder 300 may determine the luma adjusted chroma DRA scale value through scaleDra=lumaScale*((cIdx== 0)?dra_cb_scale_value: dra_cr_scale_value) wherein lumaScale denotes the luma DRA scale value, dra_cb_scale_value and dra_cr_scale_value denote initial chroma (Cb and Cr, respectively) DRA scale values, e.g., without consideration of the luma DRA scaling effects, and scaleDra denotes the chroma DRA scale value adjusted based on the luma DRA scale value.

Video decoder 300 may determine a chroma QP based on the luma adjusted chroma DRA scale value, wherein the chroma QP comprises an integer component and a fractional component (332). For example, video decoder 300 may derive the variable IndexScaleQP by invoking clause 8.9.5 of MPEG-5 EVC, ISO/IEC 23094-1:2020 Information Technology—General Video Coding—Part 1: Essential Video Coding (available at https://www.iso.org/standard/ 57797.html) the input value inValue set equal to scaleDraIlorm, scaleQp array and the size of the scaleQp array set equal to 54 as an input. Video decoder 300 may derive the variable qpDraInt as follows: qpDraInt=2*IndexScaleQP-60. Video decoder 300 may derive the variables qpDraInt and qpDraFrac as follows:

tableNum=scaleDraIlorm−scale$Qp$[IndexScale$QP$]

tableDelta=scale$Qp$[IndexScale$QP$+1]−scale$Qp$[IndexScale$QP$]

When tableNum is equal to 0, video decoder 300 may set the variable qpDraFrac equal to 0, and decrease the variable qpDraInt by 1, otherwise video decoder 300 may derive the variables qpDraInt and qpDraFrac as follows:

$qpDra$Frac=(tableNum<<10)/tableDelta $qpDra$Int+=$qpDra$Frac>>9

$qpDra$Frac=(1<<9)−$qpDra$Frac %(1<<9).

The integer and fractional components of the chroma QP may be denoted by qpDraInt and qpDraFrac, respectively.

Video decoder 300 may determine an integer chroma QP offset based on the integer component of the chroma QP (334). For example, video decoder 300 may parse a syntax element dra_table_idx and determine idx0=Clip3(−QpBdOffsetC, 57, dra_table_idx−qpDraInt) and idx1=Clip3(−QpBdOffsetC, 57, dra_table_idx−qpDraInt+1) and determine (e.g., look up) value in a table(s), such as a ChromaQpTable when determining the integer chroma QP offset. The indices idx0 and idx1 are determined based on the integer component qpDraInt of the chroma QP and used to index the ChromaQpTable to determine an integer chroma QP offset. qpDraIntAdj may denote an integer chroma QP offset.

Video decoder 300 may determine a fractional chroma QP offset based on the fractional component of the chroma QP (336). For example, video decoder 300 may use the fractional component and the integer defined table ChromaQpTable to determine the fractional chroma QP offset. qpDraFracAdj may denote a fractional chroma QP offset.

Video decoder 300 may determine a DRA chroma scale adjustment value based on the integer chroma QP offset and the fractional chroma QP offset (338). For example, video decoder 300 may determine the DRA chroma scale adjustment value by using the fractional chroma QP offset and the integer defined qpScale. draChromaScaleShift may denote a DRA chroma scale adjustment value. The DRA chroma scale adjustment value may be used to adjust a DRA chroma scale scaleDra.

Video decoder 300 may process the video data based on the DRA chroma scale adjustment value (340). For example, video decoder 300 may scale a chroma value of a chroma component of the video data based on the DRA chroma scale adjustment value.

In some examples, as part of processing the video data based on the DRA chroma scale adjustment value, the one or more processors are configured to determine a final chroma DRA scale value based on the adjusted chroma DRA scale value and the DRA chroma scale adjustment value and process the video data based on the final chroma DRA scale value.

In some examples, as part of determining the fractional chroma QP offset and as part of determining the integer chroma QP offset, video decoder 300 may determine (e.g., look up) entries in a chroma QP table. In some examples, as part of determining the fractional chroma QP offset, video decoder 300 may determine (e.g., look up) two entries in the chroma QP table, such as Qp0 and Qp1, and interpolate between the two entries, e.g., based on the fractional component of the chroma QP (qpDraFrac). In some examples, as part of determining the integer chroma QP offset, video decoder 300 may determine (e.g., look up) two entries in the chroma QP table and interpolate between the two entries.

In some examples, video decoder 300 may parse a syntax element indicative of a starting position in the chroma QP table. In some examples, the chroma QP table is predetermined. In some examples, the chroma QP table is signaled in a bitstream. dra_table_idx may denote a starting position in the chroma QP table as parsed from the bitstream.

In some examples, video decoder 300 may determine values of a plurality of DRA syntax elements, wherein the plurality of DRA syntax elements are constrained to be within a predetermined value range. In some examples, the plurality of syntax elements are configured to facilitate integer implementation. In some examples, video decoder 300 may determine a value based on one or more entries in one or more scale QP tables (such as scaleQp and/or qpScale), wherein the one or more entries are sub-sampled representations of an exponential or logarithmic function for conversion between QP and DRA scale values as shown in Equations 28 and 29. In some examples, video decoder 300 may determine the DRA luma scale value. In some examples, as part of determining the DRA luma scale value, video decoder 300 may parse a syntax element indicative of an integer component of the DRA luma scale value and of a fractional component of the DRA luma scale value. For example, video decoder 300 may determine a DRA luma scale value. For example, video decoder 300 may parse a syntax element(s) indicative of a DRA luma scale value. For example, video decoder 300 may parse lumaScale.

Figure 15:
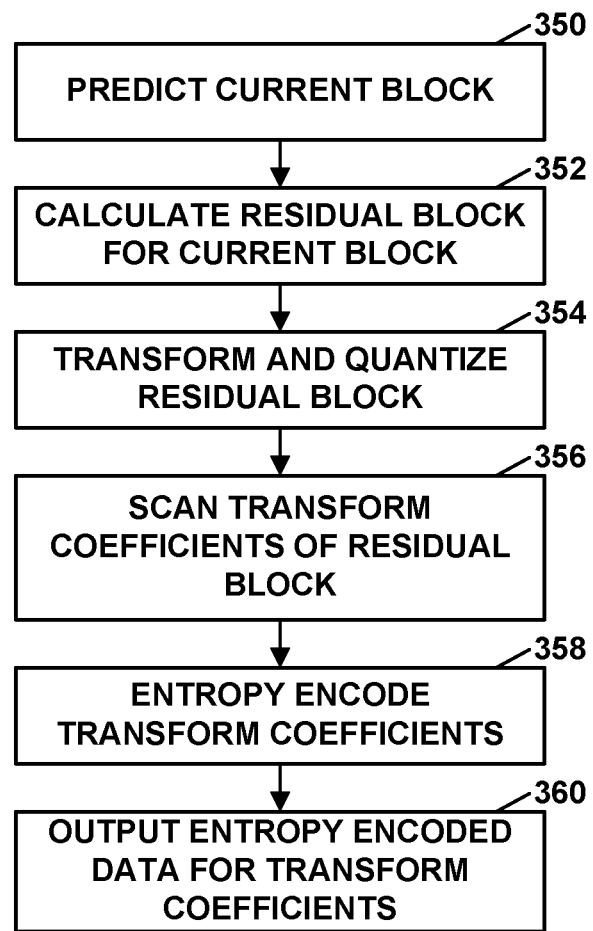
FIG. 15 is a flowchart illustrating an example of video encoding according to this disclosure.

FIG. 15 is a flowchart illustrating an example method for encoding a current block according to the techniques of this disclosure. The current block may comprise a current CU. Although described with respect to video encoder 200 (FIGS. 1 and 2), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
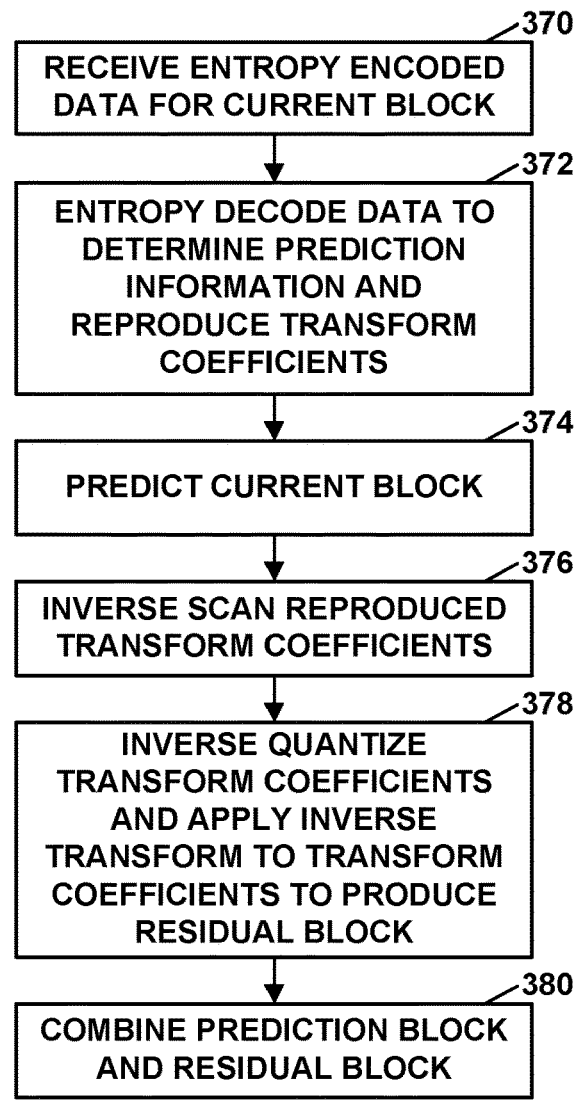
FIG. 16 is a flowchart illustrating an example of video decoding according to this disclosure.

FIG. 16 is a flowchart illustrating an example method for decoding a current block of video data according to the techniques of this disclosure. The current block may comprise a current CU. Although described with respect to video decoder 300 (FIGS. 1 and 3), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). Video decoder 300 may also apply the techniques of FIG. 13 to adjust the dynamic range of the current block.

By harmonizing DRA scaling in a manner that utilizes estimations of logarithmic and exponential operations rather than the logarithmic and exponential operations themselves, the techniques of this disclosure may reduce expense and save processing power while facilitating bit matching across different video decoders. This bit matching may allow different video decoders to process the video data in the same manner such that if a user were to switch video decoding devices, the video being processed by the video decoding device would not be processed differently by the devices.

This disclosure includes the following examples.

Clause 1A. A method of processing video data, the method comprising: performing dynamic range adjustment (DRA) on the video data; and coding the video data based on the dynamic range adjustment, wherein the performing DRA comprises utilizing a constrained bitstream of the video data.

Clause 2A. The method of clause 1A, wherein the bitstream is constrained by requiring a variable to be at least a predetermined value.

Clause 3A. The method of clause 1A or 2A, wherein the bitstream is constrained by requiring a value of a variable to be in a predetermined range.

Clause 4A. The method of any combination of clauses 1A-3A, wherein the bitstream is constrained by requiring a variable to be equal to a predetermined value.

Clause 5A. The method of any combination of clauses 1A-3A, wherein the bitstream is constrained by requiring a variable to be less than a predetermined value.

Clause 6A. A method of processing video data, the method comprising: performing DRA on the video data; and coding the video data based on the DRA, wherein the performing DRA comprises determining an integer approximation of an exponential function or a logarithmic function.

Clause 7A. The method of clause 6A, wherein the determining an integer approximation comprises determining the integer approximation from a table, the table comprising a limited number of integer values.

Clause 8A. A method of processing video data, the method comprising: performing DRA on the video data; and coding the video data based on the DRA, wherein the performing DRA comprises determining a sub-sampled representation of an exponential function or a logarithmic function.

Clause 9A. A method of processing video data, the method comprising: determining whether a scale value or a quantization parameter (QP) value is exactly tabulated; based upon the scale value or QP value not being exactly tabulated, approximating an exponential function or a logarithmic function through linear interpolation; determining an estimated scale value or QP value based on the approximation; and coding the video data based on the estimated scale value or QP value.

Clause 10A. A method of processing video data, the method comprising: performing DRA on the video data; and coding the video data based on the DRA, wherein the performing DRA comprises converting between scale values or QP values only using integer values.

Clause 11A. A method of processing video data, the method comprising any of or any combination of the techniques of this disclosure.

Clause 12A. The method of any combination of clauses 1A-11A, wherein processing comprises decoding or post-processing after decoding.

Clause 13A. The method of any combination of clauses 1A-12A, wherein processing comprises encoding or pre-processing prior encoding.

Clause 14A. A device for processing video data, the device comprising one or more means for performing the method of any combination of clauses 1A-13A.

Clause 15A. The device of clause 14A, wherein the one or more means comprise one or more processors implemented in circuitry.

Clause 16A. The device of clause 14A or 15A, further comprising a memory to store the video data.

Clause 17A. The device of any combination of clauses 14A-16A, further comprising a display configured to display decoded video data.

Clause 18A. The device of any combination of clauses 14A-17A, wherein the device comprises one or more of a camera, a computer, a mobile device, a broadcast receiver device, or a set-top box.

Clause 19A. The device of any combination of clauses 14A-18A, wherein the device comprises a video decoder or post-decoding processor.

Clause 20A. The device of any combination of clauses 14A-19A, wherein the device comprises a video encoder or pre-encoding processor.

Clause 21A. A computer-readable storage medium having stored thereon instructions that, when executed, cause one or more processors to perform the method of any combination of clauses 1A-11A.

Clause 1B. A method of processing video data, the method comprising: adjusting a chroma dynamic range adjustment (DRA) scale value based on a luma DRA scale value; determining a chroma quantization parameter (QP) based on the luma adjusted chroma DRA scale value, wherein the chroma QP comprises an integer component and a fractional component; determining an integer chroma QP offset based on the integer component of the chroma QP; determining a fractional chroma QP offset based on the fractional component of the chroma QP; determining a DRA chroma scale adjustment value based on the integer chroma QP offset and the fractional chroma QP offset; and processing the video data based on the DRA chroma scale adjustment value.

Clause 2B. The method of clause 1B, wherein processing the video data based on the DRA chroma scale adjustment value comprises: determining a final chroma DRA scale value based on the adjusted chroma DRA scale value and the DRA chroma scale adjustment value; and processing the video data based on the final chroma DRA scale value.

Clause 3B. The method of clause 1B or clause 2B, wherein determining the fractional chroma QP offset and determining the integer chroma QP offset comprises determining entries in a chroma QP table.

Clause 4B. The method of clause 3B, wherein determining the fractional chroma QP offset comprises determining two entries in the chroma QP table and interpolating between the two entries.

Clause 5B. The method of clause 3B or 4B, further comprising: parsing a syntax element indicative of a starting position in the chroma QP table.

Clause 6B. The method of any combination of clauses 3B-5B, wherein the chroma QP table is predetermined.

Clause 7B. The method of any combination of clauses 3B-5B, wherein the chroma QP table is signaled in a bitstream.

Clause 8B. The method of any combination of clauses 3B-7B, wherein determining the integer chroma QP offset comprises determining two entries in the chroma QP table and interpolating between the two entries.

Clause 9B. The method of any combination of clauses 1B-8B, further comprising: determining values of a plurality of DRA syntax elements, wherein the plurality of DRA syntax elements are constrained to be within a predetermined value range.

Clause 10B. The method of any combination of clauses 1B-9B, wherein determining the DRA chroma scale adjustment value comprises: determining a value based on one or more entries in one or more scale QP tables, wherein the one or more entries are sub-sampled representations of an exponential or logarithmic function.

Clause 11B. The method of any combination of clauses 1B-10B, further comprising determining the luma DRA scale value, wherein determining the luma DRA scale value comprises: parsing a syntax element indicative of an integer component of the DRA luma scale value and of a fractional component of the DRA luma scale value.

Clause 12B. A device for processing video data, the device comprising: memory configured to store the video data; and one or more processors implemented in circuitry and communicatively coupled to the memory, the one or more processors being configured to: adjust a chroma dynamic range adjustment (DRA) scale value based on a luma DRA scale value; determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process the video data based on the DRA chroma scale adjustment value.

Clause 13B. The device of clause 12B, wherein as part of processing the video data based on the DRA chroma scale adjustment value, the one or more processors are configured to: determine a final chroma DRA scale value based on the adjusted chroma DRA scale value and the DRA chroma scale adjustment value; and process the video data based on the final chroma DRA scale value.

Clause 14B. The device of clause 12B or clause 13B, wherein as part of determining the fractional chroma QP offset and as part of determining the integer chroma QP offset, the one or more processors are configured to determine entries in a chroma QP table.

Clause 15B. The device of clause 14B, wherein as part of determining the fractional chroma QP offset, the one or more processors are configured to determine two entries in the chroma QP table and interpolate between the two entries.

Clause 16B. The device of clause 14B or 15B, wherein the one or more processors are further configured to: parse a syntax element indicative of a starting position in the chroma QP table.

Clause 17B. The device of any combination of clauses 14B-16B, wherein the chroma QP table is predetermined.

Clause 18B. The device of any combination of clauses 14B-16B, wherein the chroma QP table is signaled in a bitstream.

Clause 19B. The device of any combination of clauses 12B-18B, wherein as part of determining the integer chroma QP, the one or more processors are configured to determine two entries in the chroma QP table and interpolate between the two entries.

Clause 20B. The device of any combination of clauses 12B-19B, wherein the one or more processors are further configured to: determine values of a plurality of DRA syntax elements, wherein the plurality of syntax elements are constrained to be within a predetermined value range.

Clause 21B. The device of any combination of clauses 12B-20B, wherein as part of determining the DRA chroma scale adjustment value the one or more processors are further configured to: determine a value based on one or more entries in one or more scale QP tables, wherein the one or more entries are sub-sampled representations of an exponential or logarithmic function.

Clause 22B. The device of any combination of clauses 12B-21B, wherein the one or more processors are further configured to determine the DRA luma scale value, wherein as part of determining the DRA luma scale value, the one or more processors are configured to: parse a syntax element indicative of an integer component of the DRA luma scale value and of a fractional component of the DRA luma scale value.

Clause 23B. The device of any combination of clauses 12B-22B, wherein the device comprises a wireless communication device.

Clause 24B. A non-transitory computer-readable storage medium having stored thereon instructions that, when executed, cause one or more processors to: adjust a chroma dynamic range adjustment (DRA) scale value based on a luma DRA scale value; determine a chroma quantization parameter (QP) based on the luma adjusted chroma DRA scale value, wherein the chroma QP comprises an integer component and a fractional component; determine an integer chroma QP offset based on the integer component of the chroma QP; determine a fractional chroma QP offset based on the fractional component of the chroma QP; determine a DRA chroma scale adjustment value based on the integer chroma QP offset and the fractional chroma QP offset; and process video data based on the DRA chroma scale adjustment value.

Clause 25B. A device for processing video data, the device comprising means for adjusting a chroma dynamic range adjustment (DRA) scale value based on a luma DRA scale value; means for determining a chroma quantization parameter (QP) based on the luma adjusted chroma DRA scale value, wherein the chroma QP comprises an integer component and a fractional component; means for determining an integer chroma QP offset based on the integer component of the chroma QP; means for determining a fractional chroma QP offset based on the fractional component of the chroma QP; means for determining a DRA chroma scale adjustment value based on the integer chroma QP offset and the fractional chroma QP offset; and means for processing the video data based on the DRA chroma scale adjustment value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   adjusting a chroma dynamic range adjustment (DRA) scale value based on a luma DRA scale value;
   determining a chroma quantization parameter (QP) based on the adjusted chroma DRA scale value, wherein the chroma QP comprises an integer component and a fractional component;
   determining an integer chroma QP offset based on the integer component of the chroma QP;
   determining a fractional chroma QP offset based on the fractional component of the chroma QP;
   determining a DRA chroma scale adjustment value based on the integer chroma QP offset and the fractional chroma QP offset; and
   processing the video data based on the DRA chroma scale adjustment value;
   wherein at least one of determining the integer chroma QP offset or determining the fractional chroma QP offset comprises determining two entries in a chroma QP table and interpolating between the two entries.

2. The method of claim 1, wherein processing the video data based on the DRA chroma scale adjustment value comprises:
   determining a final chroma DRA scale value based on the adjusted chroma DRA scale value and the DRA chroma scale adjustment value; and
   processing the video data based on the final chroma DRA scale value.

3. The method of claim 1, wherein determining the fractional chroma QP offset and determining the integer chroma QP offset comprises determining at least one entry in the chroma QP table.

4. The method of claim 1, further comprising:
   parsing a syntax element indicative of a starting position in the chroma QP table from a bitstream.

5. The method of claim 1, wherein the chroma QP table is predetermined.

6. The method of claim 1, wherein the chroma QP table is signaled in a bitstream.

7. The method of claim 1, further comprising:
   determining values of a plurality of DRA syntax elements, wherein the plurality of DRA syntax elements are constrained to be within a predetermined value range.

8. The method of claim 1, wherein determining the DRA chroma scale adjustment value comprises:
   determining a value based on one or more entries in one or more scale QP tables, wherein the one or more entries are sub-sampled representations of an exponential or logarithmic function.

9. The method of claim 1, further comprising determining the luma DRA scale value, wherein determining the luma DRA scale value comprises:
   parsing a syntax element indicative of an integer component of the DRA luma scale value and of a fractional component of the DRA luma scale value from a bitstream.

10. A device for processing video data, the device comprising:
    memory configured to store the video data; and
    one or more processors implemented in circuitry and communicatively coupled to the memory, the one or more processors being configured to:
    adjust a chroma dynamic range adjustment (DRA) scale value based on a luma DRA scale value;
    determine a chroma quantization parameter (QP) based on the adjusted chroma DRA scale value, wherein the chroma QP comprises an integer component and a fractional component;
    determine an integer chroma QP offset based on the integer component of the chroma QP;
    determine a fractional chroma QP offset based on the fractional component of the chroma QP;
    determine a DRA chroma scale adjustment value based on the integer chroma QP offset and the fractional chroma QP offset; and
    process the video data based on the DRA chroma scale adjustment value,
    wherein as part of at least one of determining the integer chroma QP offset or determining the fractional chroma QP offset, the one or more processors are configured to determine two entries in a chroma QP table and interpolate between the two entries.

11. The device of claim 10, wherein as part of processing the video data based on the DRA chroma scale adjustment value, the one or more processors are configured to:
    determine a final chroma DRA scale value based on the adjusted chroma DRA scale value and the DRA chroma scale adjustment value; and
    process the video data based on the final chroma DRA scale value.

12. The device of claim 10, wherein as part of determining the fractional chroma QP offset and as part of determining the integer chroma QP offset, the one or more processors are configured to determine at least one entry in the chroma QP table.

13. The device of claim 10, wherein the one or more processors are further configured to:
    parse a syntax element indicative of a starting position in the chroma QP table from a bitstream.

14. The device of claim 10, wherein the chroma QP table is predetermined.

15. The device of claim 10, wherein the chroma QP table is signaled in a bitstream.

16. The device of claim 10, wherein the one or more processors are further configured to:
   determine values of a plurality of DRA syntax elements, wherein the plurality of syntax elements are constrained to be within a predetermined value range.

17. The device of claim 10, wherein as part of determining the DRA chroma scale adjustment value the one or more processors are further configured to:
   determine a value based on one or more entries in one or more scale QP tables, wherein the one or more entries are sub-sampled representations of an exponential or logarithmic function.

18. The device of claim 10, wherein the one or more processors are further configured to determine the DRA luma scale value, wherein as part of determining the DRA luma scale value, the one or more processors are configured to:
   parse a syntax element indicative of an integer component of the DRA luma scale value and of a fractional component of the DRA luma scale value from a bitstream.

19. The device of claim 10, wherein the device comprises a wireless communication device.

20. A non-transitory computer-readable storage medium having stored thereon instructions that, when executed, cause one or more processors to:
   adjust a chroma dynamic range adjustment (DRA) scale value based on a luma DRA scale value;
   determine a chroma quantization parameter (QP) based on the luma adjusted chroma DRA scale value, wherein the chroma QP comprises an integer component and a fractional component;
   determine an integer chroma QP offset based on the integer component of the chroma QP;
   determine a fractional chroma QP offset based on the fractional component of the chroma QP;
   determine a DRA chroma scale adjustment value based on the integer chroma QP offset and the fractional chroma QP offset; and
   process video data based on the DRA chroma scale adjustment value,
   wherein as part of at least one of determining the integer chroma QP offset or determining the fractional chroma QP offset, the instructions cause the one or more processors to determine two entries in a chroma QP table and interpolating between the two entries.

* * * * *